(12) United States Patent
Tamaki et al.

(10) Patent No.: US 9,125,188 B2
(45) Date of Patent: Sep. 1, 2015

(54) CARRIER AGGREGATION OF CARRIERS WITH SUBFRAME RESTRICTIONS

(75) Inventors: Nobuyuki Tamaki, Manhasset, NY (US); Ghyslain Pelletier, Quebec (CA); Janet A. Stern-Berkowitz, Little Neck, NY (US); Pouriya Sadeghi, Quebec (CA); Sung-Hyuk Shin, Northvale, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 54 days.

(21) Appl. No.: 13/458,946

(22) Filed: Apr. 27, 2012

(65) Prior Publication Data

US 2013/0114472 A1    May 9, 2013

Related U.S. Application Data

(60) Provisional application No. 61/480,806, filed on Apr. 29, 2011, provisional application No. 61/556,116, filed on Nov. 4, 2011.

(51) Int. Cl.

| H04L 5/00 | (2006.01) |
|---|---|
| H04W 72/04 | (2009.01) |
| H04B 7/14 | (2006.01) |
| H04L 1/16 | (2006.01) |
| H04L 1/18 | (2006.01) |

(Continued)

(52) U.S. Cl.
CPC ............ *H04W 72/0406* (2013.01); *H04B 7/14* (2013.01); *H04L 5/001* (2013.01); *H04L 5/003* (2013.01); *H04L 5/0091* (2013.01); *H04B 7/15542* (2013.01); *H04L 1/1671* (2013.01); *H04L 1/1812* (2013.01); *H04L 5/0035* (2013.01); *H04L 2001/0097* (2013.01); *H04W 28/065* (2013.01); *H04W 48/16* (2013.01); *H04W 72/12* (2013.01); *H04W 84/047* (2013.01)

(58) Field of Classification Search
None
See application file for complete search history.

(56) References Cited

U.S. PATENT DOCUMENTS

| 2010/0232373 A1 | 9/2010 | Nory et al. |
| 2010/0246465 A1 | 9/2010 | Cai et al. |

(Continued)

FOREIGN PATENT DOCUMENTS

CN    101741710 A    6/2010

OTHER PUBLICATIONS

3rd Generation Partnership Project (3GPP), R1-110243, "Combination of Carrier Aggregation and Relay in Rel-10", 3GPP TSG RAN WG1 Meeting #63bis, Dublin, Ireland, Jan. 17-21, 2011, 3 pages.

(Continued)

*Primary Examiner* — Marcus R Smith
(74) *Attorney, Agent, or Firm* — Condo Roccia Koptiw LLP

(57) ABSTRACT

Embodiments contemplate enabling relay node uplink control information transmission on an interface between a relay node and a donor eNodeB (DeNB) in one or more subframes. Embodiments contemplate techniques to avoid restrictions on uplink transmissions on a cell (perhaps due to subframe configuration), such as on a primary cell, where the restrictions may make relay node uplink control information transmission difficult (if not impossible) on the interface between a relay node and a donor eNodeB (DeNB). Embodiments also contemplate that resources on the interface between the relay node and the donor eNodeB may be scheduled across one or more component carriers or serving cells.

22 Claims, 17 Drawing Sheets

| Uplink-downlink configuration | Subframe number | | | | | | | | | |
|---|---|---|---|---|---|---|---|---|---|---|
| | | 0 | 1 | 2 | 3 | 4 | 5 | 6 | 7 | 8 | 9 |
| SCell | 1 | D | S | U | U | D | D | S | U | U | D |
| PCell | 2 | D | S | U | D | D | D | S | U | D | D |

(51) Int. Cl.
 | | |
 |---|---|
 | H04L 1/00 | (2006.01) |
 | H04W 28/06 | (2009.01) |
 | H04W 48/16 | (2009.01) |
 | H04W 72/12 | (2009.01) |
 | H04W 84/04 | (2009.01) |
 | H04B 7/155 | (2006.01) |

(56) References Cited

U.S. PATENT DOCUMENTS

| | | | |
|---|---|---|---|
| 2011/0028148 A1 | 2/2011 | Lee et al. | |
| 2012/0163288 A1* | 6/2012 | Kim et al. | 370/315 |
| 2012/0201191 A1* | 8/2012 | Seo et al. | 370/315 |
| 2012/0287828 A1* | 11/2012 | Chen et al. | 370/280 |
| 2013/0242821 A1* | 9/2013 | Wei et al. | 370/280 |

OTHER PUBLICATIONS

ETSI TS 136.216 version 10.2.0 Release 10, "Universal Mobile Telecommunications Systems (UMTS); LTE; Evolved Universal Terrestrial Radio Access (E-UTRA); Physical Layer for relaying operation (3GPP TS 36.216 version 10.2.0 Release 10)"; Apr. 2011; 18 pages.

3rd Generation Partnership Project (3GPP), RP-110451, "LTE Carrier Aggregation Enhancements", Nokia, 3GPP TSG RAN Meeting #51, Kansas City, USA, Mar. 15-18, 2011; 19 pages.

3rd Generation Partnership Project (3GPP), R1-101197, "Full duplex multiplexing of Un and Uu subframes", 3GPP TSG RAN WG1 Meeting #60, San Francisco, USA, Feb. 22-26, 2010, 3 pages.

3rd Generation Partnership Project (3GPP), R2-095634, "FDD Relay Type I Backhaul interference and HARQ issues", InterDigital, 3GPP TSG-RAN WG2 Meeting #67bis, Miyazaki, Japan, Oct. 12-16, 2009, 17 pages.

3rd Generation Partnership Project (3GPP), TR 36.814 V1.7.2, "3rd Generation Partnership Project; Technical Specification Group Radio Access Network; Further Advancements for E-UTRA Physical Layer Aspects (Release 9)", Feb. 2010, 102 pages.

$3^{rd}$ Generation Partnership Project (3GPP); "3rd Generation Partnership Project; Technical Specification Group Radio Access Network; Evolved Universal Terrestrial Radio Access (E-UTRA); Physical layer for relaying operation (Release 10)", 3GPP TS 36.216 V10.2.0, Mar. 2011, 16 pages.

3rd Generation Partnership Project (3GPP); "3rd Generation Partnership Project; Technical Specification Group Radio Access Network; Evolved Universal Terrestrial Radio Access (E-UTRA); Physical Channels and Modulation (Release 10)", 3GPP TS 36.211 V10.1.0, Mar. 2011, 103 pages.

$3^{rd}$ Generation PartnershipProject (3GPP), TR 36.912 V10.0.0, "$3^{rd}$ Generation Partnership Project; Technical Specification Group Radio Access Network; Feasibility study for Further Advancements for E-UTRA (LTE-Advanced)", Release 10, Mar. 2011, 6 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

*Figure 2B*

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| SCell 1 | D | S | U | U | D | D | S | U | U | D |
| PCell 2 | D | S | U | D | D | D | S | U | D | D |

*Figure 6A*

| Uplink-Downlink Configuration | SF n-2 | Frame n-1 Subframe number | | | | | | | | | | Frame n Subframe number | | | | | | | | | |
|---|---|---|---|---|---|---|---|---|---|---|---|---|---|---|---|---|---|---|---|---|---|
| | 9 | 0 | 1 | 2 | 3 | 4 | 5 | 6 | 7 | 8 | 9 | 0 | 1 | 2 | 3 | 4 | 5 | 6 | 7 | 8 | 9 |
| 1 (SCell) | D | D | S | U | U | D | D | S | U | U | D | D | S | U | U | D | D | S | U | U | D |
| 2 (Pcell) | D | D | S | U | D | D | D | S | U | D | D | D | S | U | D | D | D | S | U | D | D |

*Figure 6B*

CARRIER AGGREGATION OF CARRIERS WITH SUBFRAME RESTRICTIONS

CROSS REFERENCE TO RELATED APPLICATIONS

This application claims the benefit of U.S. Provisional Patent Application No. 61/480806, titled "CARRIER AGGREGATION FOR RELAY NETWORKS", filed on Apr. 29, 2011, and U.S. Provisional Patent Application No. 61/556116, titled "CARRIER AGGREGATION OF CARRIERS WITH SUBFRAME RESTRICTIONS", filed on Nov. 4, 2011, the contents of both applications hereby incorporated by reference herein in their respective entirety, for all purposes.

BACKGROUND

Relay nodes in communication systems may be useful in handling capacity issues, such as cell edge performance. Communication system relaying functions may include repeater like functionality and also demodulating, decoding, and error correction functionality. By performing such functions in an intermediate role, a relay node may facilitate communication between a wireless transmit/receive device (WTRU, or a "user equipment" UE) and a base station, potentially with a reduced signal to noise ratio.

Long Term Evolution (LTE) capable communication systems may support data rates up to 100 Mbps in the downlink and 50 Mbps in the uplink, for example. Improvements in downlink rates may be accomplished with carrier aggregation, among other techniques. Carrier aggregation may support, for example, flexible bandwidth assignments up to 100 MHz. Carriers may be known as component carriers in some LTE systems. For example, a single contiguous downlink (DL) 40 MHz aggregation of multiple component carriers may be paired with a single 15 MHz uplink (UL) carrier.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments contemplate devices and techniques that may enable relay node uplink control information transmission on an interface between a relay node and a donor eNodeB in a subframe where the relay node may not transmit on the primary cell in the uplink. Contemplated embodiments may help avoid situations where relay node uplink control information transmission may not be possible on the interface between the relay node and the donor eNodeB (eNB), perhaps because of uplink transmission restrictions on a primary cell due to subframe configuration. Embodiments also contemplate that resources on the interface between the relay node and the donor eNodeB may be scheduled across one or more, or multiple, component carriers or serving cells.

Embodiments contemplate one or more, or multiple, serving cells or component carriers that may be associated with the interface between one or more relay nodes and the donor eNodeB (DeNB) (or one or more DeNBs). Embodiments contemplate that the one or more relay nodes may determine a subframe partition configuration for transmission between the one or more relay nodes and the donor eNodeB. For example, the relay node may receive the partition configuration from the donor eNodeB via radio resource control signaling. The relay node may apply the partition configuration on one or more of the serving cells or component carriers.

Embodiments contemplate that the serving cells that may be associated with the interface between the relay node and a donor eNodeB may include a primary serving cell and one or more secondary serving cells. In one or more embodiments, the relay node may transmit at least a portion of uplink control information on a Physical Uplink Control Channel (PUCCH) that may be associated with a secondary serving cell. Embodiments also contemplate that portions of uplink control information may be bundled and/or transmitted across a plurality of subframes between the relay node and the donor eNodeB. Further, embodiments contemplate that resources that may be associated with one serving cell may be scheduled via control signaling received on another serving cell.

Embodiments contemplate a node, where the node may be in communication with a wireless communication system. The node may be configured, at least in part, to communicate with at least a first serving cell and a second serving cell. The node may also be configured to receive a first subframe partitioning configuration for the first serving cell. In addition, the node may be configured to receive a second subframe partitioning configuration for the second serving cell. Further, the node may be configured to apply at least a part of the first subframe partitioning configuration and at least a part of the second subframe partitioning configuration to at least one of the first serving cell or the second serving cell. In one or more embodiments, the first serving cell may be a primary serving cell (Pcell) and the second serving cell may be a secondary serving cell (Scell). Also, embodiments contemplate that the first subframe partitioning configuration may be different than the second subframe partitioning configuration.

Embodiments contemplate a node that may be in communication with a wireless communication system. Embodiments contemplate that the node may be configured, at least in part, to communicate with at least a first serving cell and a second serving cell, where the first serving cell may be a primary serving cell (Pcell) and the second serving cell may be a secondary serving cell (Scell). Embodiments contemplate that the node may be configured to receive a first subframe partitioning configuration for the Pcell. Embodiments also contemplate that the node may be configured to receive a second subframe partitioning configuration for the Scell. Embodiments also contemplate that the node may be configured to transmit at least a portion of uplink control information (UCI) via a subframe of a Physical Uplink Control Channel (PUCCH) of the Scell based on a condition, where the condition may be based at least in part on at least one of the first subframe partitioning configuration or the second subframe partitioning configuration. One or more embodiments contemplate that the condition may include the first subframe partitioning configuration for the Pcell having a restricted uplink in a subframe corresponding to the subframe of the Physical Uplink Control Channel (PUCCH) of the Scell.

Embodiments contemplate a node, where the node may be in communication with a wireless communication system. Embodiments contemplate that the node may be configured, at least in part, to communicate with at least a first serving cell and a second serving cell, where the first serving cell may be a primary serving cell (Pcell) and the second serving cell may be a secondary serving cell (Scell). Embodiments contemplate that the node may be configured to receive a subframe partitioning configuration for the Pcell. Also, embodiments contemplate that the node may be configured to transmit at least a portion of uplink control information (UCI) via a subframe of a Physical Uplink Control Channel (PUCCH) of the Scell, where the Scell may have no subframe partitioning configuration.

Embodiments contemplate a node, where the node may be in communication with a wireless communication system. Embodiments contemplate that the node may be configured, at least in part, to communicate with a first component carrier and a second component carrier. Embodiments also contemplate that the node may be configured to receive a first subframe partitioning configuration for the first component carrier. Embodiments contemplate that the node may be configured to receive a second subframe partitioning configuration for the second component carrier. One or more embodiments contemplate that the first subframe partitioning configuration may be different than the second subframe partitioning configuration. Embodiments also contemplate that the node may be configured to implement cross-carrier scheduling between the first component carrier and the second component carrier utilizing a timing offset value.

BRIEF DESCRIPTION OF THE DRAWINGS

The following detailed description of disclosed embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 2B illustrates an exemplary uplink-downlink configuration consistent with embodiments;

FIG. 6A illustrates an exemplary UL/DL configuration for TDD UE consistent with embodiments;

FIG. 6B illustrates exemplary TDD UE PDSCH and HARQ timing consistent with embodiments where appropriate pairing between DL PDSCHs and UL PUCCH per cell are indicated;

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application. As used herein, the article "a", absent further qualification or characterization, may be understood to mean "one or more" or "at least one", for example.

Figure 1A:
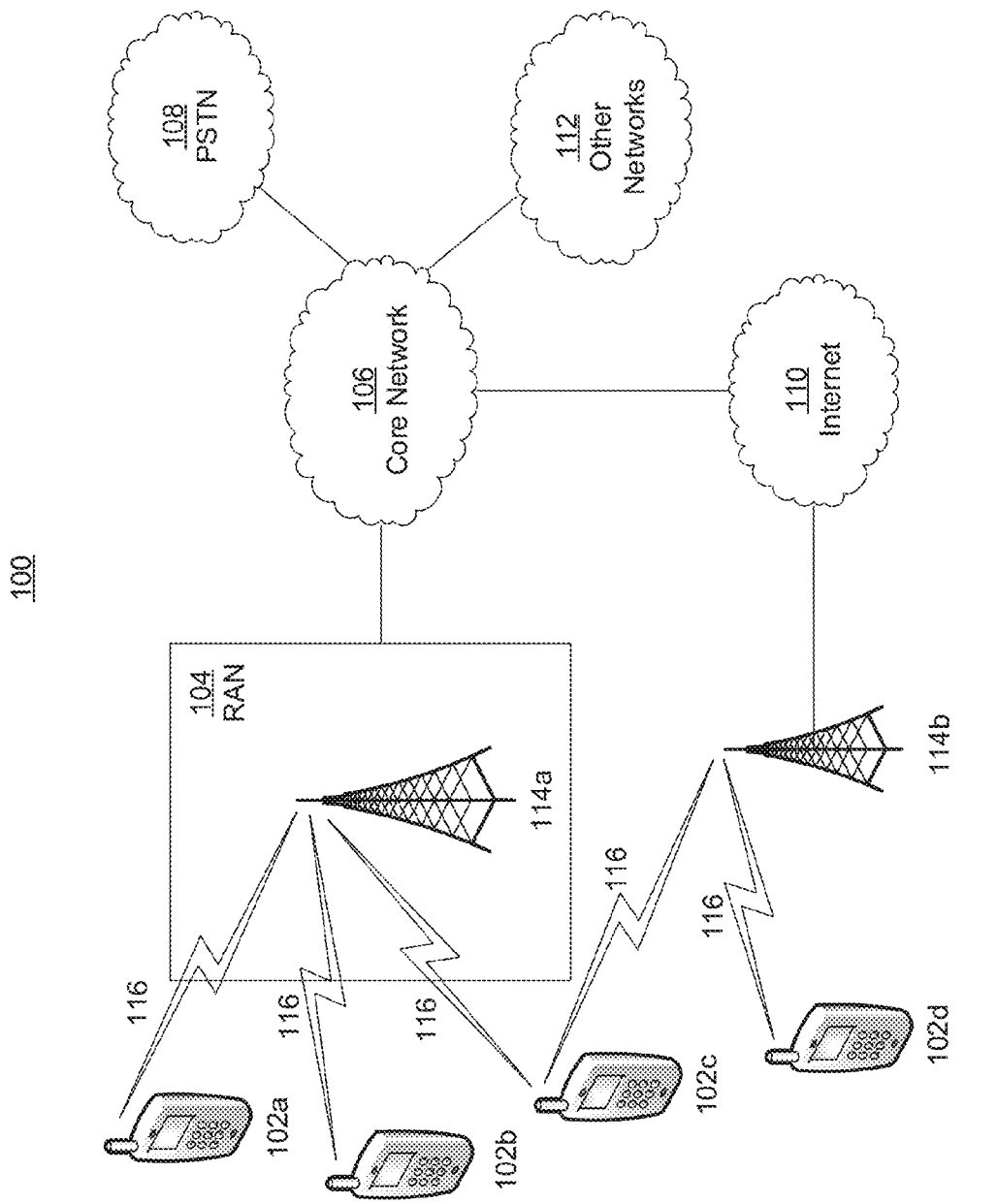
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
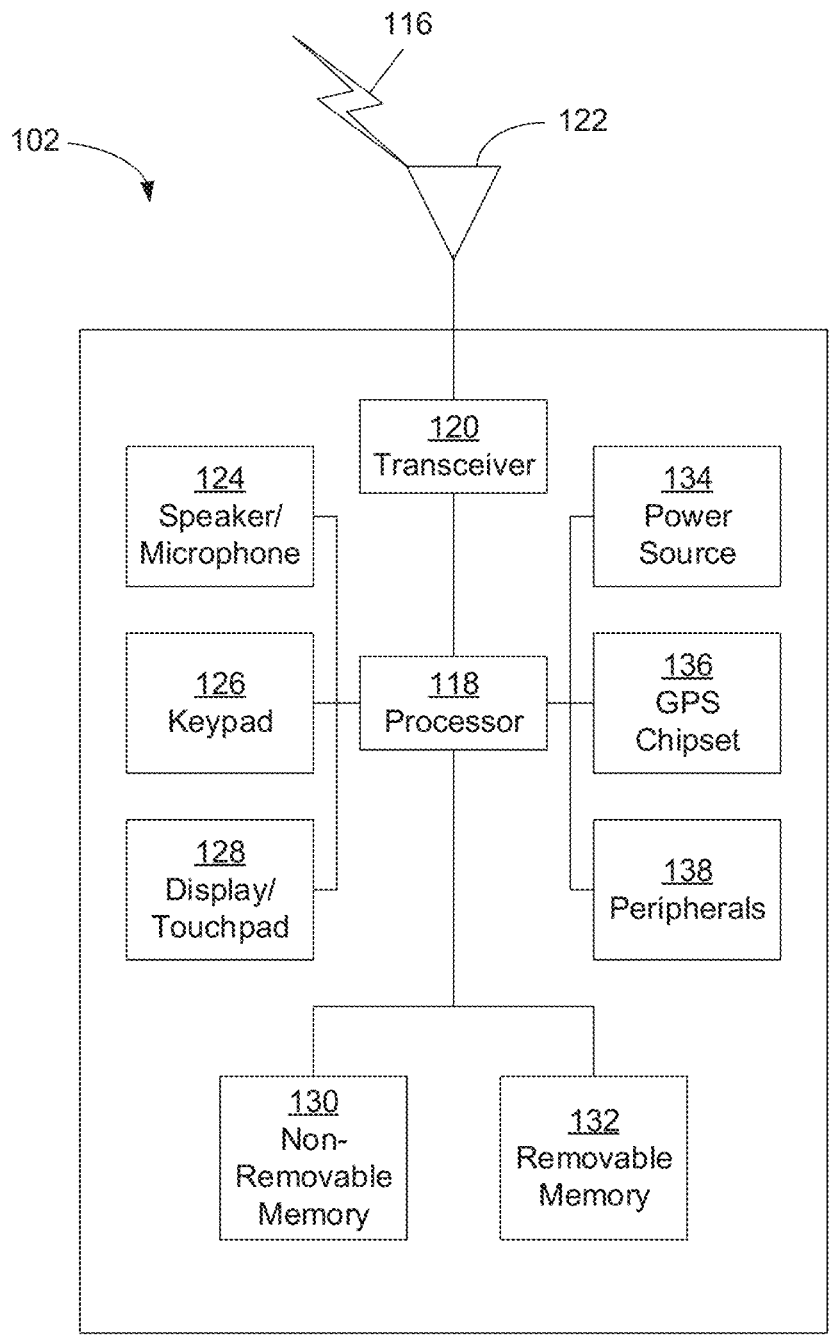
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
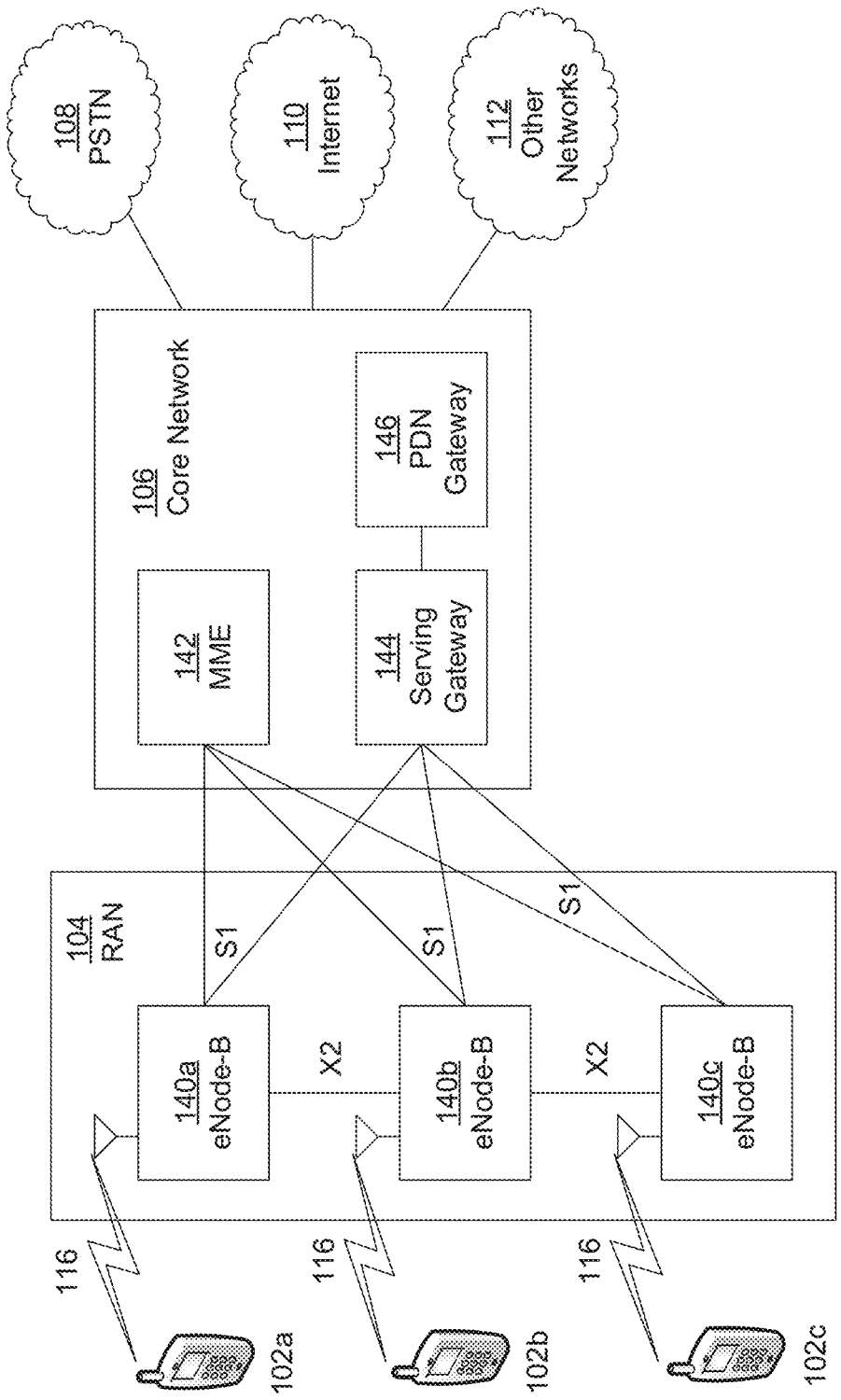
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Embodiments recognize that 3GPP LTE Release 8/9 (LTE R8/9) may support up to 100 Mbps in the downlink (DL), and up to 50 Mbps in the uplink (UL) for a 2×2 configuration, for example. The LTE downlink transmission scheme may be based on an OFDMA air interface. Embodiments recognize that LTE R8/9 systems may support scalable transmission bandwidths, for example, one of [1.4, 2.5, 5, 10, 15 or 20] MHz.

In LTE R8/9 and R10, a radio frame may include 10 milliseconds (ms). A radio frame may include 10 equally sized sub-frames of 1 ms. Each sub-frame may include 2 equally sized timeslots of 0.5 ms each, for example. Embodiments recognize that there can be 7 or 6 OFDM symbols, for example, per timeslot. For example, 7 symbols per timeslot may be used with normal cyclic prefix length, and 6 symbols per timeslot can be used in a system configuration with the extended cyclic prefix length. In one or more embodiments, the sub-carrier spacing for the LTE R8/9 system may be 15 kHz. And in one or more embodiments, a reduced sub-carrier spacing mode may use 7.5 kHz.

Embodiments contemplate that a resource element (RE) may correspond to one (1) sub-carrier during one (1) OFDM symbol interval, and in some embodiments may precisely correspond to one (1) sub-carrier during one (1) OFDM symbol interval. For example, 12 consecutive sub-carriers during a 0.5 ms timeslot could constitute one (1) resource block (RB). With 7 symbols per timeslot, each RB may include 12*7=84 RE's. A DL carrier can include a scalable number of resource blocks (RBs), for example, ranging from a minimum of 6 RBs up to a maximum of 110 RBs. By way of example, and not limitation, this may correspond to an overall scalable transmission bandwidth of roughly 1 MHz up to 20 MHz. For example, a set of common transmission bandwidths may be specified, such as 1.4, 3, 5, 10 and/or 20 MHz.

In one or more embodiments, the basic time-domain unit for dynamic scheduling may be one sub-frame that may include two consecutive timeslots. This may be referred to as a resource-block pair. Embodiments contemplate that certain sub-carriers on some OFDM symbols may be allocated to carry pilot signals in the time-frequency grid. In one or more embodiments, a given number of sub-carriers at the edges of the transmission bandwidth may not be transmitted in order to comply with spectral mask requirements, among other reasons, for example.

Embodiments recognize that carrier aggregation may improve single carrier data rates using, among other techniques, bandwidth extensions. With carrier aggregation, a WTRU may transmit and receive simultaneously over the Physical Uplink Shared Channel (PUSCH) and the Physical Downlink Shared Channel (PDSCH) of multiple serving cells, among other configurations, for example. Embodiments also recognize that in LTE R8/9 and/or for R10 in single carrier configuration where the network (NW) may assign the WTRU at least one pair of UL and DL carriers, (FDD) or one carrier time shared for UL and DL (TDD), for any given subframe there may be a Hybrid Automatic Repeat reQuest (HARQ) process active for the UL (and in some embodiments perhaps a single HARQ process active for the UL) and/or a HARQ process active in the DL (and in some embodiments perhaps a single HARQ process active in the DL).

Embodiments recognize that LTE-Advanced with Carrier Aggregation (LTE CA R10) may improve single carrier LTE data rates using, among other methods, bandwidth extensions also referred to as Carrier Aggregation (CA). With CA, in one or more embodiments the WTRU may transmit and receive simultaneously over the Physical Uplink Shared Channel (PUSCH) and the Physical Downlink Shared Channel (PDSCH) (respectively) of one or more, or multiple, serving cells. For example, up to four secondary serving cells (SCells) may be used in addition to a primary serving Cell (PCell). Flexible bandwidth assignments up to 100 MHz may be supported. Embodiments contemplate that Uplink Control Information (UCI) may include HARQ ACK/NACK feedback and/or Channel State Information (CSI). In one or more embodiments, UCI may be transmitted on Physical Uplink Control Channel (PUCCH) resources of the PCell, and/or on PUSCH resources available for a serving cell configured for uplink transmissions.

The control information for the scheduling of PDSCH and PUSCH may be sent on one or more Physical Data Control Channel(s) (PDCCH). In addition to the LTE R8/9 scheduling using one PDCCH for a pair of UL and DL carriers, embodiments recognize that cross-carrier scheduling may be supported for a given PDCCH, which may allow the network to provide PDSCH assignments and/or PUSCH grants for transmissions in other serving cell(s).

One or more embodiments recognize that for a LTE R10 WTRU operating with CA, there may be one HARQ entity for each serving cell. In one or more embodiments, some HARQ entities, or perhaps each HARQ entity, may include 8 HARQ processes, such that there may be one HARQ process per subframe for one round-trip time (RTT). Embodiments contemplate that there can be more than one HARQ process active for the UL and/or for the DL in any given subframe. In one or more embodiments, there may be at most one UL and one DL HARQ process per configured serving cell.

One or more embodiments recognize that the WTRU may not be configured for support of simultaneous PUCCH and PUSCH transmissions. For example, when there is at least one PUSCH transmission on a serving cell, in one or more embodiments the WTRU may transmit UCI on a single PUSCH transmission in a given subframe. When there is PUSCH transmission on the PCell, the WTRU may transmit UCI on that PUSCH transmission in a given subframe. Alternatively or additionally, in one or more embodiments the WTRU may transmit UCI on the PUSCH of the Scell with the lowest servCellIndex, for example, based at least in part on the index configured for some SCells or perhaps each Scell. For example, when there is no PUSCH transmission on any cell, the WTRU may transmit UCI on PUCCH of the PCell.

In one or more embodiments, simultaneous PUCCH and PUSCH transmission may be supported. Embodiments contemplate that ACK/NACK may be transmitted on PUCCH, and CSI may be transmitted on a PUSCH. The selection of PUSCH transmission may be the same as described herein with respect to the example(s) where simultaneous PUCCH and PUSCH transmission may not be supported.

In one or more embodiments, aperiodic CSI may be transmitted, for which the WTRU may receive an UL grant. The WTRU may transmit the aperiodic CSI on the PUSCH (Pcell or Scell) for which the grant was received.

Embodiments contemplate that there may be different transmission formats defined for PUCCH, such as format 1/1a/1b, 2/2a/2b and format 3. Some formats or each format may carry a different number of UCI bits. Embodiments contemplate rules that may be specified to handle cases such as but not limited to when the number of UCI bits may exceed the number of bits available for transmission of UCI, for example.

Figure 2:
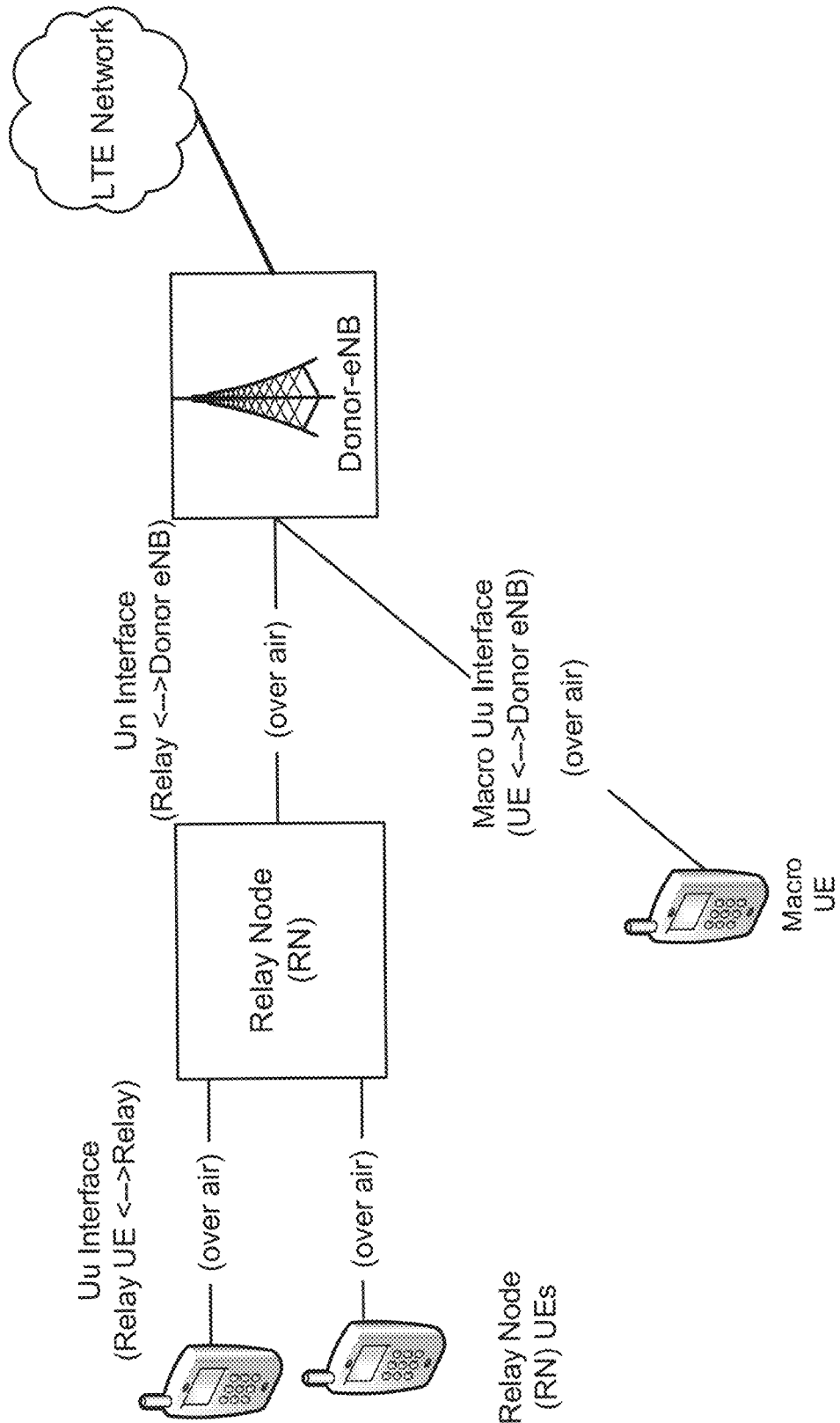
FIG. 2 illustrates an example system supporting relay nodes consistent with embodiments.

Embodiments contemplate that relay nodes (RNs) can offer a low cost alternative to evolved NodeBs (eNBs) in electronic networks. Cost reductions may be achieved when using relays, at least in part, by eliminating the capital and operating expenses associated with a wired link to the network. A relay node may serve as an intermediary for multiple user equipments (UEs) (or wireless transmit/receive units—WTRUs) to communicate with a "donor eNB" (DeNB) that may provide the WTRUs with a link to the network, for example. FIG. 2 illustrates a block diagram of an exemplary communication network architecture. As shown, a relay node (RN) may act as a serving cell for one or more WTRUs such that the WTRUs may connect to a communication network such as an LTE network. As shown, the WTRUs may communicate with the RN via an interface between the WTRU and the RN (Uu interface), and the RN may communicate with a "donor eNB" (DeNB) via an interface between the RN and the DeNB (Un interface). In one or more embodiments, an RN WTRU may include a WTRU that may have a relay node as its serving cell. Embodiments contemplate that a Macro WTRU may include a WTRU that may have an eNB as its serving cell. In one or more embodiments, the eNB may be a donor eNB for one or more RNs, for example.

As shown, a Uu Interface or RN Uu Interface may include an interface between the RN and a given WTRU that the RN may be serving. An Uu Interface may be referred to as the RN access link. A Un Interface may include an interface between the RN and its donor eNB. A Un interface may include a radio interface that may, among other things, facilitate RN traffic. The Un interface may be referred to as the backhaul interface or link. A Uu DRB/UE DRB may include DRB configured for service to/from a WTRU, for example. Uu RB/UE RB may include a radio bearer (RB) configured for service to/from a WTRU. The RB may be a data radio bearer (DRB), a signaling radio bearer (SRB), or the like. In one or more embodiments, a Un DRB may include a DRB configured for a radio bearer over Un between donor eNB and a relay node. DRB may be used to transport UE related data traffic, for example.

Embodiments recognize that in R10, carrier aggregation may apply to transmission between an eNB and a WTRU and may be extended to apply to the transmission between a RN and a WTRU, and/or between an RN and a DeNB, for example. Embodiments contemplate that the transmission between an RN and a DeNB, such as the backhaul link for example, may be extended.

Embodiments recognize that a Type 1 RN may use the same carrier frequencies on the Uu and Un interfaces. In one or more embodiments, the Type 1 RN may be unable to transmit on one interface and receive on the other at the same time due to self-interference, among other reasons. For example, the transmission on one link may interfere with the reception on the other. For this type of relay, embodiments contemplate that subframes may be partitioned between the two links to avoid this self-interference. A Un subframe configuration may be provided to the RN to, among other things, identify the subframes for backhaul communication. Embodiments recognize that a Type 1a RN may use different carrier frequencies on the Uu and the Un. In one or more embodiments, subframe partitioning may not be needed for a Type 1a RN. Embodiments recognize that a Type 1b RN may use the same carrier frequencies on the Uu and Un interfaces, and/or may have antenna isolation such that there may be no self-interference, and, in one or more embodiments, may not need subframe partitioning.

Embodiments contemplate that a RN configured to operate on the same carrier for both the Un and the Uu may be provided with a Un subframe configuration by the DeNB. For explanatory purposes, and not by way of limitation, this may be referred to as an RN subframe configuration. The RN subframe configuration may identify the subframes that may be used between the RN and DeNB for Un (backhaul) communication, for example. One or more embodiments contemplate that during Un subframes, the RN may receive a transmission from the DeNB over the Un interface, and/or during non-Un subframes, the RN may schedule transmissions to its WTRUs over its Uu interface. For Frequency Division Duplexing (FDD), in one or more embodiments, the Un subframe pattern may be configured for a 40 subframe period, and subframes {0,4,5,9} may not be configured as Un subframes, for example. By way of example and not limitation, embodiments contemplate that Time-Division Duplexing (TDD) may have its own Un subframe period and/or disallowed Un subframes and/or may take into account the UL/DL configuration.

Embodiments contemplate that the subframes configured for Un use may be configured by the RN as Multicast-Broadcast Single Frequency Network (MBSFN) subframes on the RN's Uu interface. In one or more such configured embodiments, the RN WTRUs may ignore the content of those subframes, except perhaps for the unicast control signals which may be transmitted in the first one (1) or two (2) Orthogonal Frequency Division Multiplexing (OFDM) symbols, for example. In these subframes, for example, the RN may transmit the unicast control signals to the WTRUs and/or it may switch from transmission (Tx) mode to reception (Rx) mode and/or listen to the DeNB on the Un interface.

Embodiments contemplate that the unicast control signals may be used for HARQ acknowledgement. For example, in one or more embodiments the Physical Hybrid Automatic Repeat reQuest Indicator Channel (PHICH) may be used to acknowledge uplink transmissions.

In one or more embodiments, Rel-8 WTRUs may access the RNs. In terms of throughput efficiency, there may be, for example, three (3) OFDM symbols wasted at the beginning of each subframe, and, for example, a maximum of two (2) symbols for unicast control region and one (1) for the switching time between RN Tx and RN Rx.

Embodiments contemplate that the framework of Relay Physical Downlink Control Channel (R-PDCCH) may be used to carry Downlink Control Information (DCI) for relay nodes. In one or more embodiments, the transmission of R-PDCCH may be restricted to a subset of subcarriers and OFDM symbols in a slot, and configured by Radio Resource Control (RRC). By way of example, in one or more embodiments, DCI format 3/3A may not be expected by the relay. In one or more embodiments, R-PDCCH may be used with the type 1 relay, and in some embodiments may only be used with the type 1 relay, and the regular PDCCH may be used for other types of relays, for example.

Figure 2A:
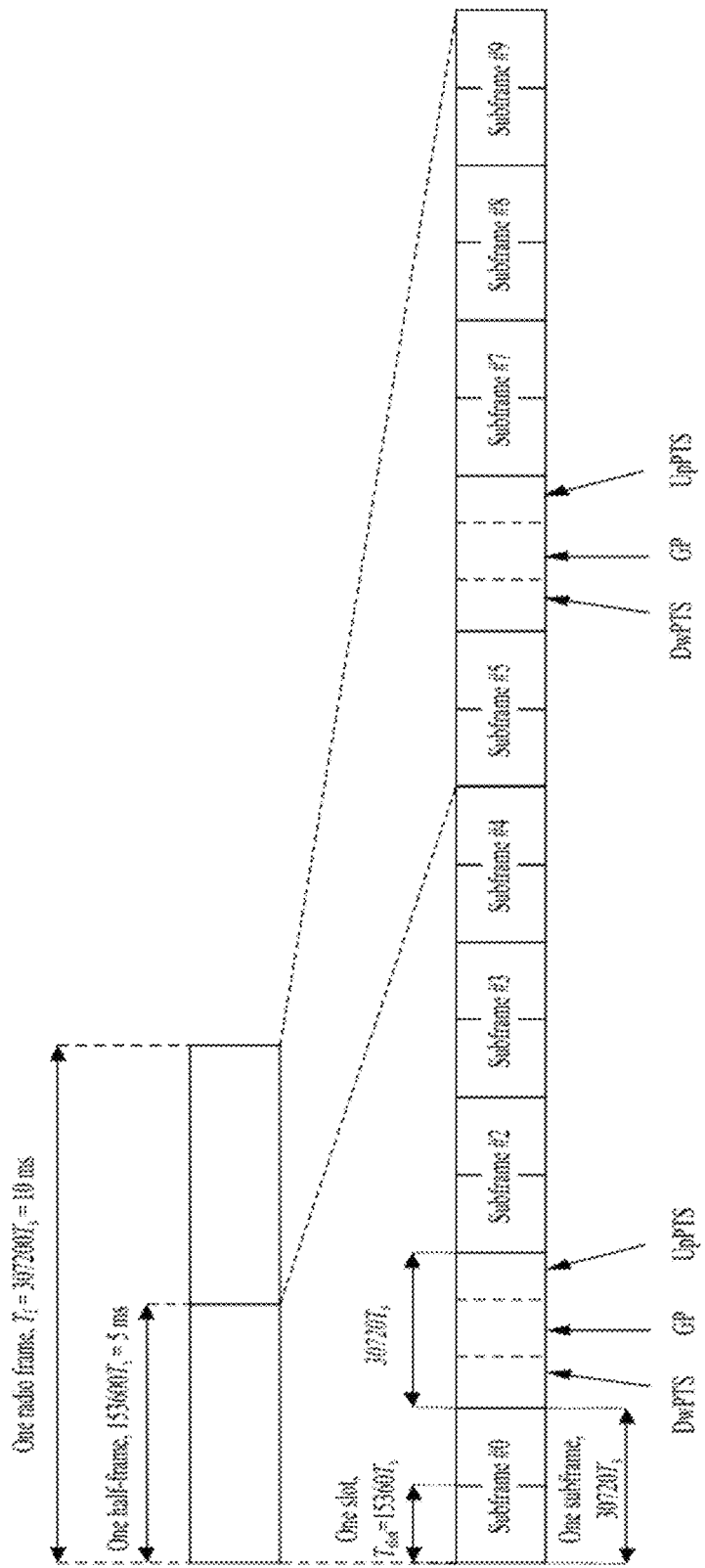
FIG. 2A illustrates an exemplary frame structure for type 2 (for 5 ms switch point periodicity) consistent with embodiments.

In addition to the FDD operation mode, embodiments recognize that LTE may support a TDD operation mode as well. Embodiments contemplate that the downlink and uplink transmissions may be performed on the same carrier frequency where the physical resources are shared in time domain. Embodiments contemplate that a 10-ms TDD frame may include 10 subframes where some subframes or each subframe may last for 1 ms as seen in FIG. 2A, for example.

Embodiments contemplate that, perhaps based on the TDD UL/DL configuration, the subframes may be divided between uplink and downlink. FIG. 2B shows exemplary TDD UL/DL configurations that may be supported in Rel-10. Switching from DL subframes to UL subframes may happen in subframe 1, and in some embodiments perhaps only in subframe 1, and possibly subframe 6, which may be referred to as the special subframes by way of explanation and not limitation. To avoid generating severe interference on the neighboring cells—among other reasons—in some embodiments the same TDD UL/DL configuration may be used for the neighboring cells, and because of this, the UL/DL configuration may be static and may not change dynamically.

Embodiments recognize that in Rel-10, intra-band carrier aggregation may be supported, and in some embodiments perhaps only intra-band carrier aggregation may be supported, and aggregated carriers for TDD may have the same TDD UL/DL configurations, and in some embodiments perhaps the aggregated carriers for TDD may be required to have the same TDD UL/DL configurations.

Embodiments contemplate carrier aggregation for carriers that may have subframe restrictions. Carriers for which not all subframes may be available for transmission or reception are referred to herein as carriers with subframe restrictions, by way of explanation and not limitation. TDD carriers may be considered subframe restricted carriers, and in some embodiments, may always be considered subframe restricted carriers, due to—among other reasons—the inherent need for time sharing the carrier between UL and DL and/or the need for an UL/DL configuration. In one or more embodiments, relay Un carriers for which a subframe configuration is provided may also be considered to be a subframe restricted carrier. The application of carrier aggregation in scenarios with subframe restricted carriers is contemplated. Deployment scenarios in which different carriers may have different subframe restrictions may present challenges that are contemplated by one or more embodiments.

Embodiments contemplate that carrier aggregation may be applied to the relay backhaul where some carriers, or each carrier, may have its own subframe configuration (restriction).

Figure 3:
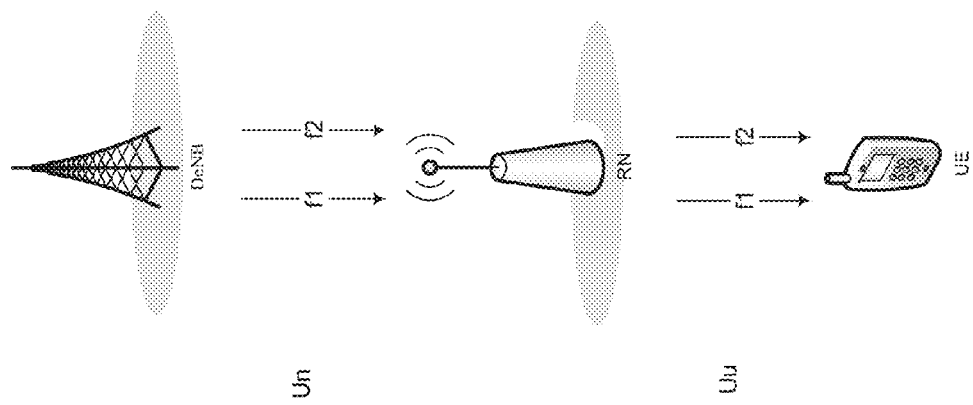
FIG. 3 illustrates an exemplary configuration for carrier aggregation with at least two available frequencies consistent with embodiments.
Figure 4:
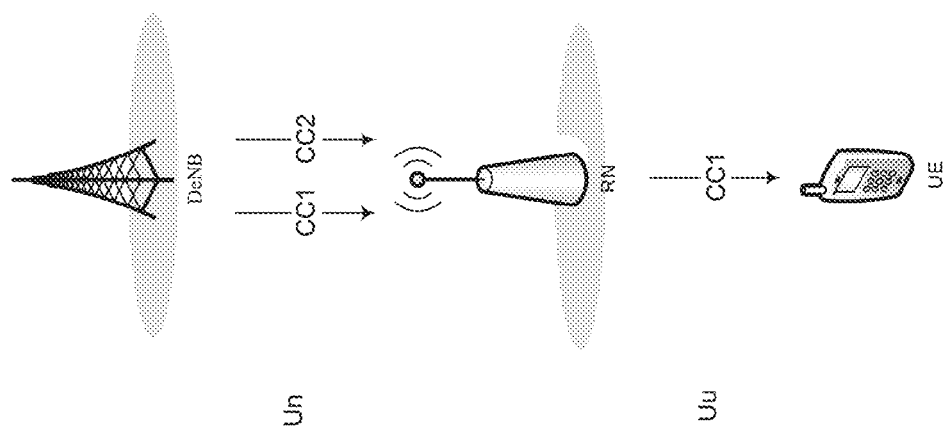
FIG. 4 illustrates another exemplary configuration for carrier aggregation with at least two available frequencies consistent with embodiments.
Figure 5:
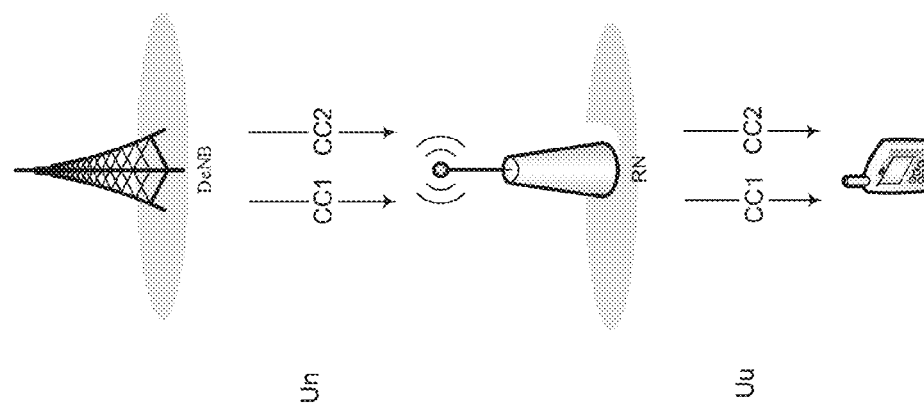
FIG. 5 illustrates another exemplary configuration for carrier aggregation with at least two available frequencies consistent with embodiments.
Figure 6:
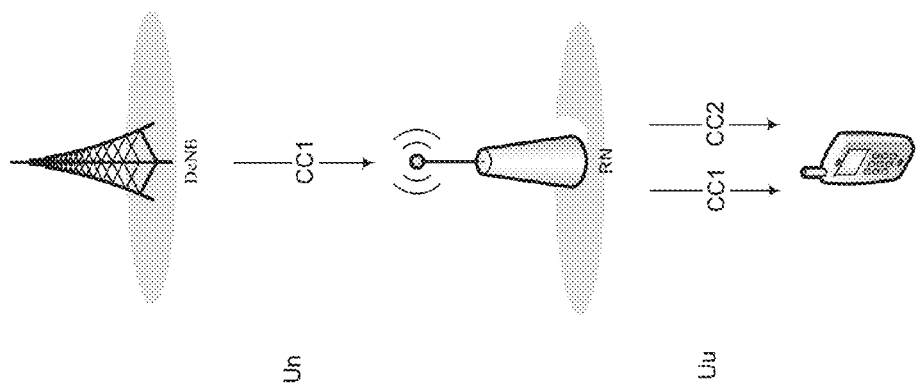
FIG. 6 illustrates another exemplary configuration for carrier aggregation with at least two available frequencies consistent with embodiments.

FIGS. 3-6 illustrate exemplary configurations for carrier aggregation with at least two available frequencies. As shown in FIG. 3, a deployment of a RN may have up to two frequencies available for carrier aggregation. Further generalizations can be derived thereof for more frequencies. Some embodiments contemplate that for any component carrier (CC) for which in-band relaying operation is identified, a subframe configuration may be included, and in some embodiments a subframe configuration may be required, resulting in subframe usage restrictions. As shown in FIG. 4, Carrier Aggregation (CA) may be configured on the Un interface with one component carrier such as CC1 deployed on f1, for example, in-band Relay operation. As shown in FIG. 5, CA may be configured on the Un interface and on the Uu interface, with one component carrier such as CC1 deployed on f1, for example, in-band Relay operation. Another component carrier such as CC2 may be deployed on f2, for example, in-band Relay operation. As shown in FIG. 6, CA may be configured on the RN Uu interface with CC1 deployed on f1, for example, in-band Relay operation.

Embodiments contemplate carrier aggregation for TDD. More specifically, carrier aggregation is considered for TDD where some carriers, or each carrier, may be configured with (possibly different) TDD UL/DL configuration. Use of different TDD UL/DL configurations may allow flexibility in deployment and may be useful for inter-band TDD aggregation, for example, among other reasons.

Embodiments contemplate that carrier aggregation may be applied to scenarios where a node may be limited by having at least one of its assigned carriers fully or partially restricted in terms of its available subframes, for example, among other contemplate scenarios. As described herein, such a node may be referred to as a Subframe-Restricted-Node or in short a "SRNode", by way of explanation and not limitation.

An example application of this arrangement is in the relay context, where carrier aggregation may be supported by the relay over the backhaul (Un) interface and/or where one or more secondary serving cell(s) may be configured for the Un interface. In such scenarios, there is a possibility that at least one of these carriers may be restricted in terms of subframe configuration; for example, PCell and/or Scell(s) may further be configured either for in-band relay operation (which may require subframe-restricted operation) or for outband relay operation. For example, referring to FIG. 4—CC1 may be configured as the PCell (for the relay in which case the Pcell would operate in-band and the Scell (CC2) would operate outband). For FIG. 5, for some combinations, or perhaps for any combination, both the PCell and the Scell may be configured for in-band relay configuration. In one or more of these exemplary scenarios, the RN may be considered an SRNode. As described herein, the Un interface of the relays is described unless another interface or interfaces is otherwise stated and/or described.

Embodiments contemplate one or more aggregation arrangements in the context of TDD where two or more carriers may be aggregated by a WTRU operating in TDD mode. In such scenarios, some carriers, or each carrier, may have its own subframe restrictions based at least in part on the carrier's TDD UL/DL configuration. Embodiments contemplate that the restrictions may be different for the different carriers. Embodiments contemplate that such TDD WTRUs may also be considered as a SRNode, for example.

By way of further example, a relay operating in TDD mode on the Un may be considered as a SRNode whether or not it requires a Un subframe configuration since the subframes may be inherently restricted by the TDD UL/DL configuration which may be defined for each TDD carrier, and in some embodiments must be defined for each TDD carrier.

One or more embodiments contemplate that, for an SRNode, subframe restrictions on the PCell may lead to situations where a subframe is not available for UL and/or DL transmissions on that cell, including the possibility that UCI (e.g. HARQ A/N, and/or CSI) may need to be transmitted in a subframe that is not available for uplink transmissions on the PCell.

Embodiments contemplate techniques to support cross-carrier scheduling for scenarios described previously. In one or more embodiments, such cross-carrier scheduling can be considered as a part of DCI transmission which may also include UL grant and/or DL grant, etc. DCI transmission may also be addressed for the SRNode scenarios when the subframe that may be used (or perhaps in some embodiments even needed) to provide the DCI transmission is not available for downlink transmissions on Pcell.

Embodiments contemplate SRNode UCI transmission to the NB or DeNB, referred to herein as (D)eNB (by way of explanation and not limitation), in a subframe where the SRNode may not transmit on the PCell UL. Embodiments also contemplate techniques to avoid situations where SRNode UCI transmission to the (D)eNB may not be possible because of—among other reasons—UL transmission restrictions on PCell due to subframe configuration (for example, the Un subframe configuration in the context of relays). Further, one or more embodiments contemplate techniques to enable SRNode cross-carrier scheduling on the aggregated carriers with different subframe restrictions, for example.

One or more embodiments contemplate subframe partitioning with CA. For example, embodiments contemplate how a SRNode may determine what subframe partitioning to apply for the configured serving cells when communicating with (D)eNB. One or more embodiments contemplate techniques that may ensure that a transmission does not occur in a subframe in which UCI transmission on the PCell may not be possible due to, among other reasons, uplink restriction on the Pcell.

One or more embodiments contemplate Uplink Control Information (UCI) transmission with CA. For example, embodiments contemplate how to select an uplink resource (e.g. PUCCH/PUSCH) for UCI transmission in a subframe for which at least one uplink resource is available on a carrier configured as a secondary serving cell, perhaps when communicating with (D)eNB (e.g., on the Un interface in relay context)—among other scenarios. This may, for example, be useful in a subframe for which few uplink resources, or perhaps no uplink resources are available, on a carrier configured as a primary serving cell, e.g., for relay Un in-band operation. Another example of the same issue may occur when a TDD WTRU may be configured with a different TDD UL/DL configuration for PCell and Scell(s).

One or more embodiments contemplate cross-carrier scheduling. Embodiments contemplate techniques to address the resources of a first uplink/downlink carrier scheduled using control signaling received on a second downlink component carrier, where the subframe configuration, e.g. the available subframes, may not be the same for the aggregated carriers. For example in the context of the relays, one or more embodiments contemplate techniques to perform cross-carrier scheduling, perhaps when one or more carriers may be configured for in-band relay operation (e.g. with a Un subframe configuration). One or more embodiments also contemplate, in TDD, techniques to perform cross-carrier scheduling, perhaps when the UL/DL configurations of the first and second carriers are different, so the available DL/UL subframes of those carriers are not the same, for example.

In one or more embodiments, a SRNode may be configured with subframe partitioning (also referred to as configuration or restriction by way of explanation and not limitation) by the (D)eNB using layer 3 RRC signaling, for example.

One or more embodiments contemplate that a SRNode may determine the subframe partitioning using one or more techniques, either individually or in combination. SRNode-specific subframe partitioning (configuration) may be provided. In one or more embodiments, the SRNode may receive a single subframe partitioning configuration which may be applied to the PCell and to some SCells or to all configured SCells.

Further, one or more embodiments contemplate that the SRNode may determine the subframe partitioning using cell-specific subframe partitioning (configuration). For example, the SRNode may receive a subframe partitioning configuration for some serving cells (or for each serving cell) for which the subframe restriction is applicable.

Further, one or more embodiments, contemplate that the SRNode may determine the subframe partitioning using cell-type specific subframe partitioning (configuration). For example, the SRNode may receive a subframe partitioning configuration for the PCell, and a different subframe partitioning applicable to the configured serving SCells to which the received subframe restriction may be applied.

Additionally, one or more embodiments contemplate that the SRNode may determine the subframe partitioning using Cell-type hybrid (specific/implicit) subframe partitioning (configuration). The SRNode may receive a subframe partitioning (configuration) for the Pcell and the subframe configuration of the Scell(s) may be allocated based at least in part on the configuration of the Pcell according to a mapping (in some embodiments perhaps a predetermined mapping) between the subframe configurations of the Pcell and Scell(s). In some embodiments, if there is more than one (1) Scell involved, the subframe configurations of those Scells may be the same or different based on at least in part the ordering of those Scells and the predetermined mapping. By way of example in the context of the TDD, if the configuration of the Pcell is set to two (2), then the configuration of the Scell may be automatically set to 1. FIG. 2B illustrates further examples of such embodiments.

Further, one or more embodiments contemplate that the SRNode may determine the subframe partitioning using cumulative subframe partitioning. For example, the SRNode may receive different subframe partitioning for one or more configured serving cells, in which case the SRNode may apply the union of the subframe configurations for at least a subset of the configured cells, or all of the configured cells. Some embodiments contemplate that the union of the subframe configurations may be applied for UL only, which may help ensure that the Scell UCI transmissions may have UL resources. Also, in some embodiments, the union of the subframe configurations may be applied for DL only, which may help ensure that the DL cross-carrier scheduling can be carried out on Pcell for Scell DL transmissions. In some embodiments, the union of the subframe partitioning may be applied such that the Pcell UL subframe configuration may be the union of the UL subframe configurations of the Pcell and the Scells for which configurations may have been received. This may help ensure that UCI for the Scells could be transmitted on the Pcell UL.

Further, some embodiments contemplate that the union of the subframe partitioning for DL and/or UL may be applied to a subset of the configured cells, and in some embodiments perhaps only to a subset of the configured cells. For example, the union of the subframe partitioning may be applied to SCells only. As an example in the context of TDD, the DL subframes of the Pcell may not be the same as those for Scell. Consequently, one subframe might be configured as a Pcell DL whereas it is a Scell UL. In such scenarios, embodiments contemplate that the Scell DL subframes might be considered as a union of Pcell's and Scell's DL subframes. By doing so, the Scell previously configured UL subframe (described previously) may become a DL subframe for the Scell. Embodiments contemplate half-duplex TDD-WTRUs, where the simultaneous transmissions of UL and DL may not be supported, and therefore, in some subframes or in each subframe the communication directions (e.g., Tx and Rx) of some or all of the aggregated cells may either be the same—and/or some cells may be muted during one or more subframes.

Further, one or more embodiments contemplate that the union may be applied for the direction, but not for the transmission or reception. For example, for a TDD half-duplex WTRU or RN, the DL direction may be given priority such that if any CC is configured for DL in a subframe, the SRNode considers the direction to be DL, but may expect to receive (and in some embodiments may only expect to receive, e.g., may only look for) DL transmission on a CC specifically configured for DL in that subframe. Some embodiments also contemplate that this may only be applicable to SRNodes operating half-duplex, for example. Embodiments contemplate, by way of example and not limitation, that a DL (or UL) union of one or more subframe configurations may be defined per subframe across those subframe configurations where the UL/DL direction of a subframe may be assumed to be the same in those subframe configurations and it may be determined as DL (or UL) if there exists at least one subframe configuration which has that specific subframe as a DL (or UL) subframe.

Alternatively or additionally, one or more embodiments contemplate intersected subframe partitioning. The SRNode may receive different subframe partitioning for one or more configured serving cells, in which case the SRNode may apply the intersection of the subframe configurations for at least a subset of the configured cells, or all of the configured cells. For example, in some embodiments, the intersection of the subframe configurations may be applied for UL only or the DL only. Also by way of example, in some embodiments, the PCell configuration may be used unchanged and/or the SRNode may be restricted to using subframes of one or more SCells that have the same direction as the PCell and/or the SRNode may not use the subframes of said SCells if their direction is different than that of the PCell. Also, some embodiments contemplate that intersected subframe partitioning may only be applicable to SRNodes operating half-duplex, for example. Embodiments contemplate, by way of example and not limitation, that a DL (or UL) intersection of one or more subframe configurations may be defined per subframe across those subframe configurations where the UL/DL direction of a subframe may be assumed to be the same in those subframe configurations and it may be determined as DL (or UL) if all of those subframe configurations have that specific subframe as a DL (or UL) subframe.

Embodiments contemplate that UL configurations may be explicitly provided to the SRNode or implicitly provided, for example in R10 relays. Also for example, UL subframe configuration for Un may be derived from the DL configuration (e.g., DL+4 for FDD). A UL subframe configuration may be determined (e.g., according to the DL to UL derivation rules) whether or not a unique UL Scell is configured for each DL serving cell. In one or more embodiments, the RN (as a SRNode) may have two (2) configured DL serving cells and one configured UL serving cell, for example. Un subframe partitioning may be received by the RN for both the DL cells. The partitioning for the UL serving cell, such as the Pcell, may be the union of the UL partitioning that may be used by both of the DL serving cells (or in some embodiments perhaps may be needed for both of the DL serving cells), e.g., DL+4 for FDD for both DL cells. This may enable the RN to transmit UCI for both DL cells on the PCell UL, among other benefits, for example.

Embodiments contemplate that in relay applications for subframes for which the RN may add an UL subframe to its Un configuration, collisions with reception on the Uu UL may be avoided via scheduling, or via an MBSFN subframe on the Uu link. This subframe may be the DL subframe associated with the UL subframe for which the UL subframe is added on the Un (e.g., UL-4 for FDD).

By way of further example for relays, in FDD in order for the RN to not receive access link data in subframe n, the RN may not provide an UL grant in subframe n-4. The RN may not receive ACK/NACK on the access link in subframe n. The RN may not provide a DL grant in subframe n-4. The RN may avoid UL and DL grants on the access link in subframe n-4, such that traffic and UCI on the UL in subframe n may be avoided. The RN may configure subframe n-4 as an MBSFN subframe such that the access WTRUs may not need to read PDCCH. Similarly, embodiments contemplate that the TDD rules may be used for TDD.

In one or more embodiments, a SRNode may be configured with a subframe configuration for the PCell and/or for one or more SCells. The SRNode may be configured with one or more PUCCH resource allocation on a Scell. For example, the SRNode may be configured with one or more PUCCH resources on a Scell in addition to the PUCCH resources on the PCell.

Embodiments contemplate that the uplink resource for transmission of UCI on PUCCH may be selected. The SRNode may be configured with one or more PUCCH resources for a Scell configured with uplink. The Scell configuration for PUCCH may be received using higher layer signaling such as RRC signaling or, using layer 1 signaling (e.g. PDCCH, in addition to the PUCCH configuration for the PCell). For example, higher layer signaling and/or layer 1 signaling may indicate whether or not the SRNode may transmit on the PUCCH resources configured for a concerned serving cell. In one or more embodiments, the indication may be implicit, for example, based on the presence of a PUCCH configuration for the concerned Scell. In one or more embodiments, the indication may be explicit, for example, via L1 PDCCH (or R-PDCCH in the context of relays, for example), L2 MAC or L3 RRC signaling. The SRNode may perform transmission on PUCCH of a serving cell according to any of the existing methods described in LTE R10, and/or using any of the methods described herein.

Embodiments contemplate that the uplink resource for transmission of UCI on PUCCH may be selected considering the configured PUCCH resources for serving cells for which the SRNode may use for transmission, and in some embodiments perhaps considering only the configured PUCCH resources for serving cells for which the SRNode may use for transmission. For a serving cell for which the SRNode may not be allowed to transmit UCI on PUCCH, the SRNode may drop UCI for the concerned cell in a subframe. In the subframe, the SRNode may have UCI to transmit (and may normally transmit such UCI), but embodiments recognize that there may not be any available uplink resource for transmission of the UCI on the PUSCH resource of a cell or on the PUCCH of the PCell.

For one or more embodiments described herein for transmitting UCI in a given subframe, the need for SRNode transmission of UCI on PUCCH, and possibly SRNode transmission of UCI on PUCCH, may be limited to cases in which there is no PUSCH transmission in the subframe by the SRNode and/or cases in which there may be PUSCH transmission in the subframe by the SRNode but the SRNode may not be configured for or may not support simultaneous PUSCH-PUCCH transmission.

Embodiments contemplate that the SRNode may transmit at least part of the UCI on the PUCCH of a Scell configured with uplink PUCCH resources. For example, the SRNode may transmit simultaneously on the PUCCH of a plurality of serving cells configured with a PUCCH resource on which the RN may be allowed to perform a PUCCH transmission. For example, in case the RN is not configured for or does not support simultaneous PUSCH-PUCCH transmissions, in one or more embodiments—transmissions of UCI on the PUCCH of the concerned Scell may be limited to subframes where PUSCH is unavailable on a serving cell. Also, in one or more embodiments, transmissions of UCI on the PUCCH of the concerned Scell may be limited to subframes where PUSCH is unavailable for the concerned Scell.

Embodiments contemplate that in scenarios where there is no PUCCH available on Pcell, the UCI may be sent over PUSCH of the Scell based on, at least in part, UL grant for the Scell and/or based on configuration of the Scell with (possibly periodic) PUSCH transmission with no required UL grant. In one or more embodiments, for subframes which are not configured for UL on the Pcell, the UCI may be sent over PUSCH of the Scell based on UL grant for the Scell and/or based on configuration of the Scell with (possibly periodic) PUSCH transmission with no required UL grant. For example, the determination of whether the SRNode may perform a transmission on the PUCCH of a Scell may be based on a function of the Pcell's subframe partitioning.

For example, the RN (as an SRNode) may transmit on the PUCCH of a Scell in a subframe for which transmission on the uplink of the PCell may be impossible due to the Un subframe restriction of the PCell. The RN may multiplex a Scheduling Request (SR) on the PUCCH transmission for a Scell.

By way of further example, in some embodiments, the TDD WTRU may transmit UCI on the PUCCH of a Scell in a subframe for which transmission on the uplink of the PCell is not possible due to UL/DL configuration of the PCell, and perhaps only in such a subframe. The UCI may be UCI that the WTRU would have transmitted on the PUCCH of the PCell if the subframe was an UL subframe for the PCell. The WTRU may multiplex a SR on the PUCCH transmission for a Scell. In another example, the SRNode (e.g., RN or TDD WTRU) may transmit on the PUCCH of a Scell in a subframe for which the Scell may not be restricted for uplink transmission by the subframe partitioning applicable to the Scell. The SRNode may not multiplex SR on the PUCCH transmission for a Scell.

The SRNode may transmit UCI on SCells as needed and according to the restrictions imposed by subframe configurations of the SCells, if any, without being limited by the subframe configuration of the PCell. When the use of the Scell's PUCCH is restricted to subframes for which the SRNode may not transmit on the uplink of the PCell, the SRNode may transmit UCI in a subframe for which there is at least one serving cell with configured uplink PUCCH for which an uplink transmission is possible, for example.

Embodiments contemplate that the SRNode may transmit PUCCH for the Scell with configured PUCCH resources, for example, by using PUCCH transmission rules similar to those for single carrier LTE operation in a serving cell.

For example, in one or more embodiments, the SRNode may transmit UCI on the PUCCH of a Scell in an available subframe, in which case dynamic selection of a PUCCH resource by the SRNode may be dynamically allocated using any of the PUCCH format 1/1a/1b or 2/2a/2b depending on the amount of UCI bits to transmit. In some embodiments, the UCI may include UCI for the concerned Scell only.

Embodiments contemplate that transmission of UCI on a Scell may be applied when the UCI transmission includes HARQ ACK/NACK information for a PDSCH transmission that may be dynamically scheduled using the PDCCH of the Scell DL. Transmission of UCI on a Scell may be applied when periodic CSI for the Scell may be configured for transmission in this subframe and/or if CSI request is transmitted following an aperiodic request received on the PDCCH (or R-PDCCH) of the Scell DL.

Embodiments contemplate that the SRNode may transmit PUCCH for the Scell with configured PUCCH resources by using, for example, Rel-10 PUCCH transmission rules similar to those for LTE operation for carrier aggregation for a PCell.

For example, in one or more embodiments, the SRNode may be configured by higher layer signaling with one or more PUCCH resources on a Scell. UCI feedback for a plurality of serving cells may be transmitted on the PUCCH of the Scell, for example, as a function of the SRNode's PCell subframe partitioning. In some embodiments, this may be similar to a configuration for the PUCCH for the PCell applied to a Scell. Such resources may include, but are not limited to, resources for channel selection with format 1b and/or format 3.

The SRNode may select the semi-static PUCCH resource on the Scell in a subframe for which the SRNode cannot perform an uplink transmission on the PCell, perhaps because of the subframe partitioning on the PCell. In some embodiments, only if such transmission on the Scell UL is available according to the Scell's subframe partitioning (if any). In some embodiments, the selection of the use of the semi-static PUCCH resource may be according to the same rules as for a PCell, or according to another rule described herein. In some embodiments, transmission on PUCCH may be applied to transmit UCI comprising of HARQ ACK/NACK information for one of more serving cells, and in some embodiments perhaps only to transmit UCI comprising of HARQ ACK/NACK information for one of more serving cells. In some embodiments, transmission on PUCCH may be applied for other transmissions.

Embodiments contemplate that a RN may transmit UCI to the (D)eNB on the PUCCH of a Scell in a subframe as a function of the Pcell's SRNode subframe partitioning, for example. Alternatively or additionally, embodiments contemplate that the SRNode may transmit UCI on the PUCCH of a Scell in a subframe as a function of the Scell's SRNode subframe partitioning, for example, perhaps if configured and different than that of the PCell, and/or if no partitioning is configured, among other conditions. Embodiments also contemplate that the SRNode may select the PUCCH resource of a Scell for UCI transmission, perhaps if the Scell is configured for uplink transmission and/or if the Scell has a PUCCH resource available for UCI transmission in the subframe, among other conditions, for example.

Embodiments contemplate that a SRNode may handle UCI with one or more techniques, either individually or in combination. One or more embodiments contemplate that the SRNode may transmit at least part of the UCI on the PUCCH of at least one Scell in a subframe for which the subframe partitioning of the PCell may not allow the SRNode to transmit on the uplink resource of the PCell. Further, one or more embodiments contemplate that the SRNode may transmit at least part of the UCI on the PUCCH of a Scell in a subframe for which the subframe partitioning of the concerned Scell, if configured, may allow the SRNode to transmit on the uplink resource of the Scell. Also, one or more embodiments contemplate that the SRNode may transmit at least part of the UCI on the PUCCH of a Scell that may not be configured with a subframe partitioning and hence some or all FDD and UL (TDD, FDD half-duplex) subframes may be available for UL UCI transmission. Further, one or more embodiments contemplate that, perhaps if a resource that can convey at least part of the UCI is available on more than one Scell in the subframe, the SRNode may transmit the UCI on a single resource possibly by selecting the PUCCH of the Scell based on a semi-static configuration of the SRNode such as selecting the Scell with the smallest cell index, for example. Also, one or more embodiments contemplate that, perhaps if there is no serving cell on which a resource can be used for the UCI transmission in the subframe, among other conditions for example, the SRNode may discard at least part of the UCI. Alternatively or additionally, the SRNode may use a method described herein such as bundling of HARQ ACK/NACK bits on a transmission performed in a subsequent subframe.

By way of example, and not limitation, embodiments contemplate that when communicating with (D)eNB, perhaps if the subframe partitioning of the PCell of the SRNode allows the SRNode to transmit UCI on the PUCCH of the PCell, among other conditions for example, the SRNode may transmit the UCI on the PUCCH of the PCell.

Also by way of example, and not limitation, one or more embodiments contemplate that for the Un interface, perhaps if the subframe partitioning of the PCell of the SRNode does not allow the SRNode to transmit UCI on the PUCCH of the PCell, the subframe partitioning and the PUCCH configuration of at least one Scell with configured uplink may allow the SRNode to transmit UCI in this subframe. One or more embodiments contemplate that, perhaps if there is a single serving cell for which an uplink transmission of the UCI is possible among other conditions for example, the SRNode may transmit the UCI on the PUCCH of that Scell. Alternatively or additionally, one or more embodiments contemplate that, perhaps if there is no single serving cell for which an uplink transmission of the UCI is possible among other conditions for example, the SRNode may transmit the UCI on the PUCCH of the Scell according to its semi-static configuration, such as but not limited to the Scell corresponding to the smallest cell index. In one or more embodiments, HARQ ACK/NACK feedback may be transmitted on Scell PUCCH, and in some embodiments perhaps only HARQ ACK/NACK feedback may be transmitted on Scell PUCCH. In one or more embodiments other information may be transmitted on Scell PUCCH.

One or more embodiments contemplate that, perhaps if the subframe partitioning of the PCell of the SRNode does not allow the SRNode to transmit UCI on the PUCCH of the PCell, and/or the subframe partitioning and the PUCCH configuration of at least one Scell with configured uplink does not allow the SRNode to transmit UCI in this subframe, among other conditions for example, the SRNode may not transmit UCI on the uplink for any serving cell in this subframe and/or may drop the UCI for this subframe.

One or more embodiments contemplate that, perhaps if uplink transmission on a Scell is not restricted, whereas the PCell subframe is restricted (e.g., not available), among other conditions for example, the SRNode may transmit UCI on PUCCH of the Scell.

One or more embodiments contemplate a TDD WTRU as a SRNode with, for example, two (2) serving cells, PCell and one Scell, with different UL/DL configurations to illustrate an exemplary transmission of UCI on the PUCCH of the Scell when the required UL subframe on the Pcell may not be available. Referring to FIG. 6A, in such scenarios, UL/DL configuration 2 may be used for PCell, and UL/DL configuration 1 may be used for Scell. FIG. 6A shows exemplary UL/DL/S subframe allocations for each configuration.

By way of further example, perhaps based on Rel-10 HARQ timing, FIG. 6B shows an example of PDSCH reception and corresponding HARQ-ACK transmission by a WTRU given the UL/DL configurations shown in FIG. 6A. In FIG. 6A, each pattern corresponds to a pairing of PDSCH reception and the corresponding HARQ-ACK transmitted by the TDD WTRU per cell. For example, referring to the PCell, for UL/DL configuration 2, HARQ-ACK transmitted in Frame n subframe 2 corresponds to DL PDSCH reception of data that occurred in Frame n−1 subframes 4,5,6,8 (in some embodiments, ACK/NACK may be bundled in TDD).

Referring to the Scell in FIG. 6B, the HARQ-ACK corresponding to DL PDSCH received in frame n−1 subframe 9 should be sent to the eNB in frame n subframe 3 and would normally be sent in that subframe on the PCell PUCCH if no PUSCH resources are available. In this example, the PCell does not have an UL subframe configured in frame n subframe 3. In this case, in accordance with one or more embodiments, the TDD WTRU may transmit HARQ-ACK information on frame n subframe 3 on Scell PUCCH if configured, or possibly on a pre-defined or pre-scheduled Scell PUSCH resource, for example.

Embodiments contemplate that the SRNode may transmit UCI to the (D)eNB on a selected PUCCH resource of a Scell using a format that may be a function of the SRNode's subframe partitioning for the configured serving cells.

One or more embodiments contemplate that in a subframe, a maximum number of HARQ ACK/NACK bits may be derived at least from the configuration of the transmission mode used for downlink transmissions on PDSCH. For example, the maximum number of HARQ ACK/NACK bits may be derived based on the number of spatial layers used, and/or the maximum number of transport block per subframe for a given serving cell. In addition, some subframes may be configured such that a downlink transmission may be impossible due to subframe partitioning, which may differ for each configured serving cell. For example, the configuration may be semi-static and may be modified using, e.g., layer 3 RRC signaling, such that the restrictions imposed by the SRNode's subframe partitioning may additionally be used to determine the maximum number of HARQ ACK/NACK bits for each subframe. One or more embodiments contemplate that at least a bit for the transmission of a Scheduling Request (SR) bit may be included.

For example, one or more embodiments contemplate that a SRNode may be configured with a plurality of PUCCH resources where some resources or each resource may be used when a specific range of HARQ ACK/NACK and/or CSI bits are transmitted. This configuration may be for the PCell, for a Scell, and/or may be distributed across a plurality of serving cells. By way of example, and not limitation, one or more embodiments contemplate that PUCCH format 1 may carry at most 1 bit of UCI information, PUCCH format 2 may carry at most 2 bits of UCI information, channel selection with PUCCH format 2 may carry up to 4 bits of UCI information while PUCCH format 3 may carry up to 12 bits of UCI information. In one or more embodiments, for a given subframe, the SRNode may determine the maximum number of transport blocks that it may receive across configured serving cells as a function of the configuration of the cell and/or as a function of each cell's RN partitioning. For example, the SRNode may select the smallest PUCCH format available for the transmission of the concerned UCI in the subsequent subframe in which the SRNode is expected to transmit UCI. The configuration may be applied in a subframe in which the SRNode transmits HARQ ACK/NACK bits, and in some embodiments perhaps only transmits HARQ ACK/NACK. In one or more embodiments, the configuration may be applied in a subframe for which the SRNode may not transmit on the uplink of the PCell, and in some embodiments perhaps only in a subframe for which the SRNode may not transmit on the uplink of the PCell. Embodiments contemplate that configuration may be applied in conjunction with other methods described herein, such as but not limited to the methods described regarding selection of a PUCCH resource.

Embodiments contemplate that a SRNode may drop and/or discard at least part of the UCI available for transmission to the (D)eNB in a given subframe as a function of the SRNode's subframe partitioning.

Alternatively or additionally, embodiments contemplate that a SRNode may apply bundling to at least part of the UCI where bundling may be applied across UCI bits of a plurality of subframes. In one or more embodiments, the number of subframes may be a function of the SRNode subframe configuration, for example.

Embodiments contemplate that a SRNode may perform bundling for a number of subframes that may equal to the number of subframes for which the SRNode does not have a transmission opportunity for any UCI feedback to the (D)eNB for a specific serving cell. In one or more embodiments, the SRNode may perform bundling for a Scell when the SRNode transmits at least part of the UCI on the PUCCH of a Scell configured with uplink PUCCH resources, and in some embodiments perhaps only for a Scell when the SRNode transmits at least part of the UCI on the PUCCH of a Scell configured with uplink PUCCH resources. In one or more embodiments, the SRNode may perform bundling for the PCell.

In one or more embodiments, the SRNode may perform bundling for a number of subframes that may equal to the number of subframes for which the SRNode may not have a transmission opportunity for UCI feedback to the (D)eNB for the serving cells. In one or more embodiments, the SRNode may perform bundling when the SRNode transmits UCI on the PUCCH of a Scell in a subframe at least as a function of the Pcell's SRNode subframe partitioning, and in some embodiments perhaps only when the SRNode transmits UCI on the PUCCH of a Scell in a subframe at least as a function of the Pcell's SRNode subframe partitioning.

Embodiments contemplate HARQ ACK/NACK bundling. In one or more embodiments, bundling of HARQ ACK/NACK may be performed by generating one or more HARQ ACK/NACK bits by performing a logical AND operation across a plurality of HARQ ACK/NACK bits for individual PDSCH transmission and/or in response to received PDCCH, e.g. a PDCCH indicating downlink SPS release, or R-PDCCH in the relay context. The SRNode may be provided with the capability to detect one or more missed assignments. The SRNode may consider the detection of a missed PDCCH assignment as a situation warranting a NACK in the bundling operation, perhaps depending on the bundling operation used (e.g. for HARQ ACK/NACK of a given cell and/or of a given subframe), among other conditions for example.

Embodiments contemplate that UCI bundling may include spatial bundling (in some embodiments perhaps for the PCell only), spatial bundling (per cell), cell grouping bundling that may include bundling across SCells and/or bundling across all serving cells, and/or subframe bundling.

In one or more embodiments, there may be no uplink transmission opportunity for the UCI on the PCell or on a serving cell for a subframe. The SRNode may bundle the HARQ ACK/NACK information for each configured serving cell for which bundling is applicable via one or more techniques, either individually or in combination. In one or more embodiments, the SRNode may spatially bundle HARQ ACK/NACK information across multiple codewords of a same subframe for the PCell. Further, in one or more embodiments, the SRNode may spatially bundle HARQ ACK/NACK information across multiple codewords of a same subframe for each configured SCells. Also, embodiments contemplate that the SRNode may bundle HARQ ACK/NACK information of a same subframe across multiple serving cells. Further, one or more embodiments contemplate that the SRNode may bundle HARQ ACK/NACK information across multiple subframes. Further, in one or more embodiments, bundling may be configured for HARQ ACK/NACK information bits for serving cells. Also, one or more embodiments contemplate that bundling may be configured for serving cells with subframe restrictions. Further, in one or more embodiments, bundling may be configured for HARQ ACK/NACK information bits of a configured serving cell. And, in one or more embodiments, bundling may be configured for HARQ ACK/NACK information bits of an activated serving cell.

Embodiments contemplate that at least one additional bit for the transmission of a Scheduling Request (SR) bit may be added to the bundling operation of one of the resulting information bit, for example.

Embodiments contemplate deriving corresponding downlink assignments for some or all DL subframes associated with a UL subframe via one or more techniques, either individually or in combination. In one or more embodiments, downlink assignments may be based on the sum of the number of successfully decoded PDCCH (or R-PDCCH) assignments (dynamic scheduling) and/or the number of semi-persistent downlink allocations. Further, one or more embodiments contemplate that downlink assignments may be based on the sum of the number of signaled PDCCH (or R-PDCCH) assignments, possibly explicitly signaled in a successfully received DCI format (dynamic scheduling) and/or the number of semi-persistent downlink allocations.

Embodiments contemplate that a SRNode may compute one or more of the aforementioned sums. In one or more embodiments, if the sums are unequal for a given uplink subframe, among other conditions for example, the SRNode may report NACK either for the bundled information for a serving cell, or for the entire subframe. The RN may compute the sums, for example, if bundling is applied per subset of serving cells, e.g. per type of serving cell.

In one or more embodiments, if the SRNode is configured for UCI transmission on the PCell only, among other conditions for example, the SRNode may determine the number M of downlink assignments for DL subframes that may be associated with a single UL subframe to determine whether or not at least one downlink assignment is missed. The SRNode may perform a logical AND operation per codeword for a given serving cell across N subframes. N may be determined as a function of the SRNode partitioning such that N may represent the number of subframes since the last subframe for which the SRNode has an opportunity to transmit any UCI information in the uplink for the concerned serving cell. In one or more embodiments, the result may be one HARQ ACK/NACK bit per spatial layer. Alternatively or additionally, the result may be a single bit for the layers. One or more embodiments contemplate that the resulting set of bits may be ordered and/or coded for uplink transmission of a PUCCH format that can convey at least the resulting number of bits, for example. Alternatively or additionally, the resulting bits may be ordered based on the index of the serving cell, e.g. increasing order of the configured serving cell identity. Embodiments contemplate that the SRNode may select a PUCCH resource using a suitable format for transmission of the resulting bits and/or may perform the transmission in the next uplink subframe for which an uplink transmission is possible according to the subframe restriction, for example.

Embodiments contemplate that the SRNode may apply bundling across some or all configured SCells. Alternatively or additionally, one or embodiments contemplate that the SRNode may apply bundling across SCells that may not be configured for transmission on PUCCH, and in some embodiments perhaps only across SCells that may not be configured for transmission on PUCCH.

In one or more embodiments, perhaps if the SRNode is configured to transmit uplink feedback on a plurality of serving cells, among other conditions for example, spatial and/or subframe bundling may be applied only to serving cells for which the uplink transmission is constrained by an SRNode subframe partitioning for the concerned cell, and in some embodiments perhaps only to serving cells for which the uplink transmission is constrained by an SRNode subframe partitioning for the concerned cell. One or more embodiments contemplate that spatial and/or subframe bundling may be applied to serving cells configured to transmit UCI on PUCCH, and in some embodiments perhaps only to serving cells configured to transmit UCI on PUCCH.

Referring to FIG. 4, a RN may be configured over the Un with at least two carriers. Carrier CC1 may be configured as the PCell with Un subframe configuration and Carrier CC2 may be configured as Scell with no Un subframe configuration. In some embodiments, the configuration for UL may be performed asymmetrically to DL, where UL resources may be allocated to PCell only, and no UL resources may be allocated to Scell.

Figure 7:
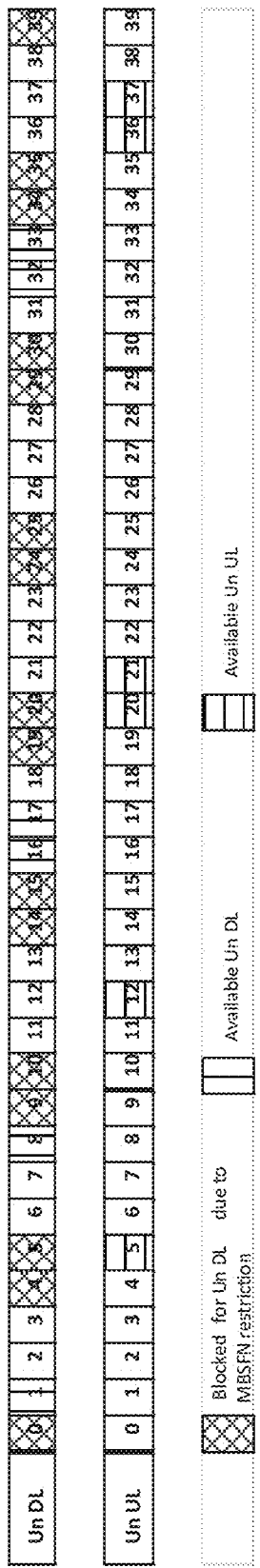
FIG. 7 illustrates an example primary cell relay node and donor eNodeB subframe configuration pattern consistent with embodiments.

Embodiments contemplate that a PCell may be configured with Un subframe configuration of subframes configuration of {11000000}. FIG. 7 illustrates an example primary cell relay node (as a SRNode) and donor eNodeB subframe configuration pattern contemplated by embodiments. The availability of subframes for PCell transmission on DL and UL are illustrated in FIG. 7 for one or more exemplary embodiments. In one or more embodiments, the Scell without Un subframe configuration, can schedule DL transmission on any subframe.

Considering the Pcell described previously and illustrated in FIG. 7, the RN on the Scell may be scheduled with DL data on Scell in subframes #2, #3, #6, #7. The corresponding HARQ-ACK for those DL transmissions may be sent on the UL on subframes #6, #7, #10, #11, to maintain the n+4 HARQ-ACK timing. The RN may not have an opportunity to transmit on UL until the next UL transmission opportunity on the PCell, which occurs on subframe #12. As such, the RN while receiving the DL data on the 4 subframes, may first spatially bundle HARQ-ACK for each codeword received in each of the subframes. The RN may bundle each HARQ-ACK over time, each HARQ-ACK for every subframe received (DL subframes received for 6,7,10,11) until the next UL transmission opportunity (subframe #12). The UL UCI information transmitted in subframe #12 from the RN may include a bundled combination of HARQ-ACKs for each codeword for each of the 4 subframes.

One or more embodiments contemplate that the number of HARQ-ACKs bundled may depend on DL transmission scheduling on the Scell and/or the Un subframe configuration of the PCell. Some embodiments contemplate that the number of HARQ-ACKs bundled can be expanded for instances of other Scell configurations as well.

Embodiments contemplate that the SRNode may group a plurality of HARQ ACK/NACK bits, perhaps to transmit UCI on PUCCH among other reasons, for example. One or more embodiments contemplate that the HARQ ACK/NACK bits may correspond to one or more transmissions received in one or more serving cells and/or received in one or more subframes. In one or more embodiments, the SRNode may transmit the group of bits by multiplexing the bits in a UL transmission by using PUCCH format 3. For example, the SRNode may transmit the group of bits, perhaps in some embodiments after a bundling operation is performed.

In one or more embodiments, the SRNode may order the HARQ ACK/NACK bits before encoding the bits in a PUCCH format 3, with consideration for their corresponding serving cell as well as their corresponding subframe. The ordering of the bits for transmission in a specific uplink subframe using PUCCH format 3 may be performed using a two dimensional matrix that may include the cell index and subframe index for some or each HARQ-ACK bit. For example, in the relay context, the mapping and ordering of the bits may be similar to the usage of PUCCH format 3 for TDD mode, except that instead of being a function of the TDD configuration it may include a function of the Un subframe configuration for some or each serving cell. For example, the first PUCCH format 3 bit(s) may include the HARQ ACK/NACK bit for a transmission received in the oldest subframe reported in the PUCCH transmission, starting from HARQ ACK/NACK bit(s) of the serving cell with the smallest configured serving cell identity (e.g. servCellID), followed by HARQ ACK/NACK bits for subsequent subframes ordered in a similar manner and up to the most recent subframe for which the PUCCH transmission is reporting HARQ ACK/NACK. For example, perhaps no later than a subframe that may be a fixed amount of subframes before the transmission on the PUCCH, where the fixed amount may correspond to a fixed processing time of (e.g. 4 subframes/ms).

One or more embodiments contemplate that the aforementioned techniques for the multiplexing of HARQ ACK/NACK bits may be applied to CSI transmission. In addition, embodiments contemplate that HARQ ACK/NACK bits may be multiplexed with CSI bits, where a predetermined order may be used. For example, CSI bits may be appended to HARQ ACK/NACK bits.

Embodiments contemplate that cross-carrier scheduling may allow for one component carrier (scheduling component carrier) to schedule DL assignments for Physical Downlink Shared Channel (PDSCH) transmissions and UL grants for Physical Downlink Shared Channel (PUSCH) transmissions on another component carrier (e.g., a scheduled component carrier).

Embodiments contemplate cross-carrier scheduling from component carriers with subframe partitioning (e.g. restriction). Further, embodiments contemplate the support of (D)eNB cross-carrier scheduling when the aggregated carriers assigned to the SRNode have different subframe restrictions, among other conditions. For example, one or more embodiments contemplate techniques that, in relays, may be used for cross-carrier scheduling on a Un component carrier (e.g., serving cell) with Un subframe partitioning, e.g., on an in-band serving cell with a Un subframe configuration.

One or more embodiments contemplate that cross-carrier scheduling on the DL control channel (e.g., R-PDCCH in relays) may be supported using an indication field corresponding to the index of the scheduled component carrier within the DCI format transmitted on that control channel. In one or more embodiments, a Carrier Indicator Field (CIF) may indicate for what cell the DCI format may be scheduling resources.

Alternatively or additionally, embodiments contemplate cross-carrier scheduling on the DL control channel (e.g., R-PDCCH in relays or PDCCH for WTRUs) may be supported using an offset in the DCI format. The offset value may represent a timing offset indicative of the number of subframes between the subframe of the scheduled downlink transmission and the subframe in which the RN or WTRU may receive and/or successfully decodes the DCI on the R-PDCCH (or PDCCH). In one or more embodiments, the offset value may be included for DCI formats corresponding to a scheduled downlink transmission and/or retransmission, and in some embodiments, may be included only for DCI formats corresponding to a scheduled downlink transmission and/or retransmission.

By way of example, and not limitation, embodiments contemplate that, perhaps as a consequence of the SRNode's subframe configuration, among other conditions for example, the SRNode may receive PDCCH or R-PDCCH on a scheduling component carrier at subframe n, but not at subframe n+1, n+2. In one or more embodiments, the same PDCCH or R-PDCCH may have been configured for cross-carrier scheduling of the scheduled component carrier. Further, in one or more embodiments, the scheduled component carrier may have a different subframe configuration than that of the scheduling component carrier, and may have its next downlink transmission opportunity at subframe n+2. The SRNode may receive on PDCCH or R-PDCCH of the scheduling carrier in subframe n a DCI that may contain the CIF of the scheduled carrier, and/or an offset value in case of a DCI (e.g. a DCI format 1, 2 or 3 for a downlink assignment) for the timing of the corresponding downlink transmission (by way of example and not limitation, 2 subframe/ms if the total distance is signaled, or a codepoint if a table is used).

Alternatively or additionally, embodiments contemplate cross-carrier scheduling on the DL control channel (e.g., R-PDCCH in relays) may be supported using a timing offset similar to the one described previously and may be used to schedule uplink transmissions in the scheduled carrier.

By way example, and not limitation, embodiments contemplate that in a processing time for FDD of 4 subframes (e.g. 4 ms) from the reception of an uplink grant until the corresponding uplink transmission is performed, the SRNode may receive a grant on the scheduling component carrier at subframe n+1 for a scheduled uplink transmission for subframe n+5 on the scheduled component carrier. In one or more embodiments, the offset may be specified as the total distance between the subframe of the reception of the DCI and the subframe of the corresponding uplink transmission or the same distance less a fixed processing time (e.g. 4 ms processing time). Further, one or more embodiments contemplate that a table of codepoints for offsets may be defined as a function of the subframe configuration of the scheduled carrier.

One or more embodiments contemplate that an offset may be included in the DCI format. The offset value may represent a timing offset indicative of a number of subframes between the subframe of the scheduled uplink transmission and the subframe in which the SRNode receives and/or successfully decodes the DCI on the DL control channel, e.g., R-PDCCH in relays. In one or more embodiments, the offset value may be included for DCI formats corresponding to a scheduled downlink transmission and/or retransmission, and in some embodiments may be included only for DCI formats corresponding to a scheduled downlink transmission and/or retransmission.

By way of example, and not limitation, embodiments contemplate that, perhaps as a consequence of the SRNode's subframe configuration, the SRNode may receive PDCCH or R-PDCCH on a scheduling component carrier at subframe n, but not at subframe n+1, n+2. The same PDCCH or R-PDCCH may have been configured for cross-carrier scheduling of the scheduled component carrier. The scheduled component carrier may have a different subframe configuration than that of the scheduling component carrier, and may have its next uplink transmission opportunity at subframe n+5. The SRNode may receive on PDCCH or R-PDCCH of the scheduling carrier in subframe n a DCI that may contain the CIF of the scheduled carrier, as well as an offset value in case of a DCI (e.g. a DCI format 0 for an uplink grant) for the timing of the corresponding uplink transmission (e.g. either 5 subframe/ms if the total distance is signaled, or 1 subframe/ms if the processing time is excluded from the offset).

Alternatively or additionally, embodiments contemplate implicit offset timing. One or more embodiments contemplate that the offset value may be a function of the SRNode subframe partitioning of the scheduled component carrier. For example, the subframe to which the signaled DCI is applicable may be the next subframe for which a downlink transmission may be received by the SRNode from the (D)eNB on the scheduled carrier or the next subframe for which an uplink transmission may be performed by the SRNode on the scheduled carrier. For example, the signaled DCI may be applicable to the first subframe after a predetermined number of subframes. For example, signaled DCI may be applicable to the first subframe after the processing time allowed for the corresponding control signaling (e.g. 4 subframes or ms for the uplink for FDD). One or more embodiments contemplate that the predefined or predetermined number of subframes may be a function of the subframe number in which the DCI (e.g., UL grant) is received and, in some embodiments, the subframe configuration of one or more of the scheduling cell and/or the cell being scheduled.

Alternatively or additionally, embodiments contemplate blind decoding. One or more embodiments contemplate that a SRNode may perform blind decoding attempts such that the SRNode may decode multiple DCI formats on the scheduling carrier in a given subframe. The number of attempts may be a function of the subframe configuration of the scheduled carriers. For example, the SRNode may determine a maximum number of decoding attempts based at least in part on some or each scheduled carrier of the number of possible DCIs that may be received. If there is no subframe partitioning, no additional blind decoding attempt may be performed. In one or more embodiment, perhaps if the scheduled carrier may not be scheduled for downlink and/or uplink transmissions in one or more consecutive subframes starting from a fixed number X of subframes (e.g., X ranging from 0 up to a predetermined number of subframes for processing time) following this subframe, perhaps due to a restriction of the scheduling carrier's subframe partitioning, additional blind decoding attempts may be performed to include possible DCIs for those subframes. For example, for downlink DCIs, X may be equal to 0. Also by way of example, for uplink DCIs, X may be equal to 4. Alternatively or additionally, X may be equal to a maximum number of subframes that may be addressed by the explicit offset value range that may be signaled in the corresponding DCIs.

In one or more embodiments, the SRNode may stop decoding attempts of the DL control channel (e.g., R-PDCCH for relays) until it has exhausted the search space and/or until the SRNode has decoded a number of DCI equal to the number of possible transmissions that may be performed across subframes determined using at least one of the above guidelines, whichever comes first.

In one or more embodiments, a scheduling component carrier may be restricted due to subframe configuration for transmission to SRNode on subframe n to schedule on the scheduled component carrier. The scheduling component carrier may be allowed to transmit to SRNode on subframes n, n+1, and n+2. The scheduling component carrier may, on its DL control channel (e.g., R-PDCCH for relays transmitted at subframe n), include 3 instances of DCI with CIF for the scheduled component carrier, along with offset value of 0, 1, and 2 respectively to indicate the subframe for which the DCI may be applied.

Embodiments contemplate that the number of DCIs that can be scheduled for UL (for example DCI format 0) and/or for DL (for example DCI format 1,2,3) may be limited by the allowed DL control channel space, e.g., R-PDCCH space for relays. In one or more embodiments, blind decoding may be performed until the DL control channel search space is exhausted.

Embodiments contemplate the determination of UL HARQ process identity. In one or more embodiment, perhaps when cross-carrier scheduling is not used, the uplink HARQ processes may be sequentially assigned to subframes configured for the uplink transmissions to the (D)eNB based on the subframe partitioning, for example.

Alternatively or additionally, embodiments contemplate that to support cross-carrier scheduling, for example, on the DL control channel (e.g., R-PDCCH for relays), the SRNode may determine the identity of the uplink process. In one or more embodiments, the identity of the uplink process may be determined based on the subframe configuration of the scheduled component carrier, e.g. using a relation n+4+k, perhaps for FDD, where k may be based on the subframe partitioning of the scheduled carrier and, in particular, for cross-carrier scheduling of retransmissions.

Embodiments contemplate cross-carrier scheduling from a carrier without subframe restriction. Further, one or more embodiments contemplate cross-carrier scheduling from component carriers without subframe partitioning as a scheduling carrier. For example, the SRNode may be configured with any serving cell that does not have subframe partitioning, such as an out-of-band serving cell in the context of relays.

In one or more embodiments, the SRNode may be configured with an Scell that may not have subframe partitioning (e.g., restrictions) as a scheduling carrier for the Pcell which may have subframe partitioning. This may allow for use of R-PDCCH space to be limited, which may release the R-PDCCH for use for more PDSCH data, for example.

Alternatively or additionally, the embodiments described herein regarding cross-carrier scheduling in the context of relays from a component carrier with Un subframe partitioning may be applied to cross-carrier scheduling with PDCCH. For example, the embodiments described herein for determining the identity of a UL HARQ process when the scheduled component carrier may be restricted by a Un subframe partitioning may be applied to cross-carrier scheduling with PDCCH.

Figure 8:
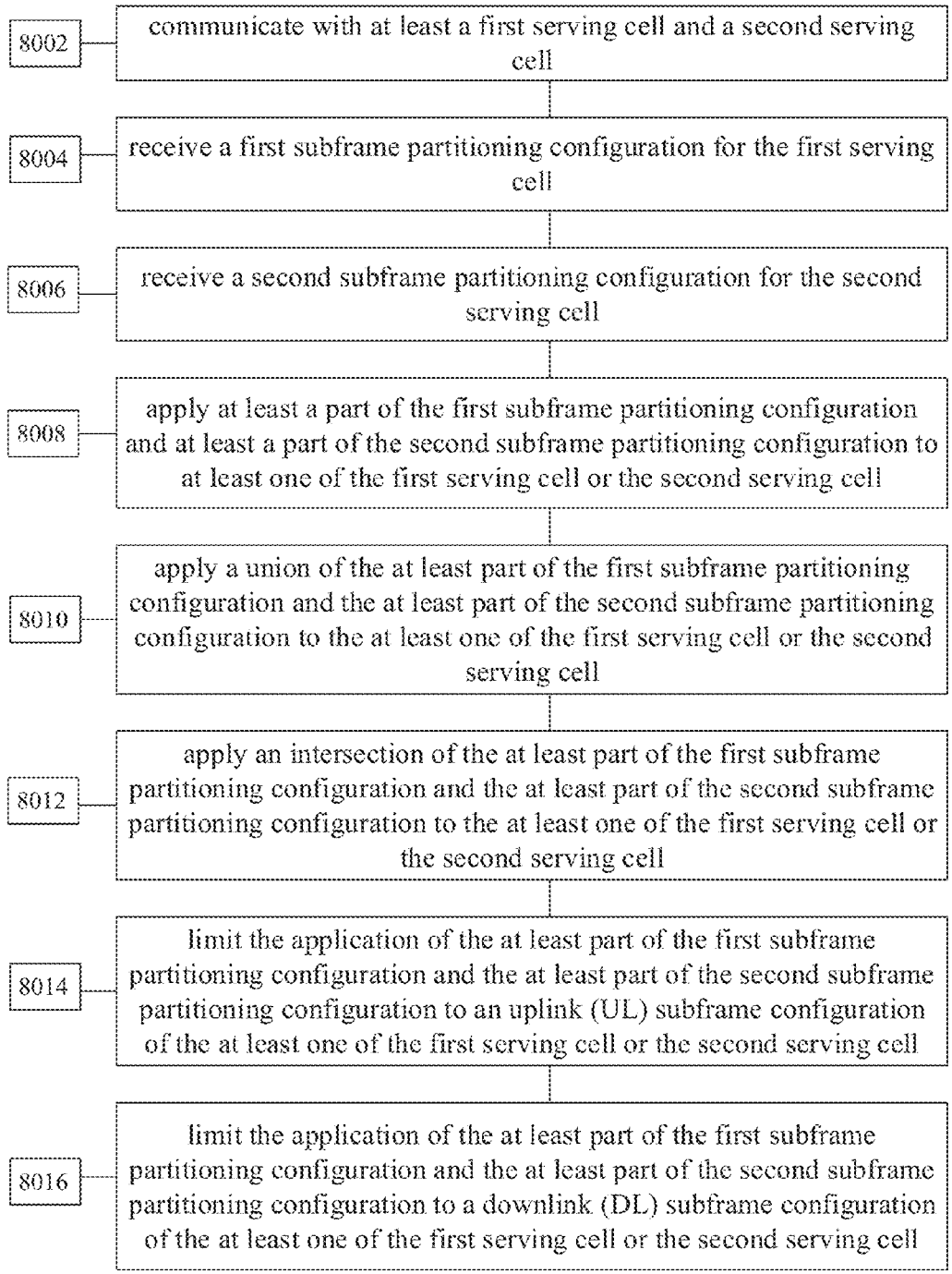
FIG. 8 illustrates a block diagram of one or more techniques regarding subframe restricted nodes consistent with embodiments.

In light of the descriptions herein, and referring to FIG. 8, embodiments contemplate a node, where the node may be in communication with a wireless communication system. At 8002, the node may be configured, at least in part, to communicate with at least a first serving cell and a second serving cell. At 8004, the node may be configured to receive a first subframe partitioning configuration for the first serving cell. At 8006, the node may be configured to receive a second subframe partitioning configuration for the second serving cell. At 8008, the node may be configured to apply at least a part of the first subframe partitioning configuration and at least a part of the second subframe partitioning configuration to at least one of the first serving cell or the second serving cell. Embodiments contemplate that the first serving cell may be a primary serving cell (Pcell) and the second serving cell may be a secondary serving cell (Scell). In one or more embodiments, the first subframe partitioning configuration may be different than the second subframe partitioning configuration.

Alternatively or additionally, embodiments further contemplate that, at 8010, the node may be further configured to apply a union of the at least part of the first subframe partitioning configuration and the at least part of the second subframe partitioning configuration to the at least one of the first serving cell or the second serving cell. Alternatively or additionally, at 8012, embodiments contemplate that the node may be further configured to apply an intersection of the at least part of the first subframe partitioning configuration and the at least part of the second subframe partitioning configuration to the at least one of the first serving cell or the second serving cell.

Alternatively or additionally, embodiments contemplate that, at 8014, the node may be further configured to limit the application of the at least part of the first subframe partitioning configuration and the at least part of the second subframe partitioning configuration to an uplink (UL) subframe configuration of the at least one of the first serving cell or the second serving cell. Alternatively or additionally, embodiments contemplate that, at 8016, the node may be further configured to limit the application of the at least part of the first subframe partitioning configuration and the at least part of the second subframe partitioning configuration to a downlink (DL) subframe configuration of the at least one of the first serving cell or the second serving cell.

Figure 9:
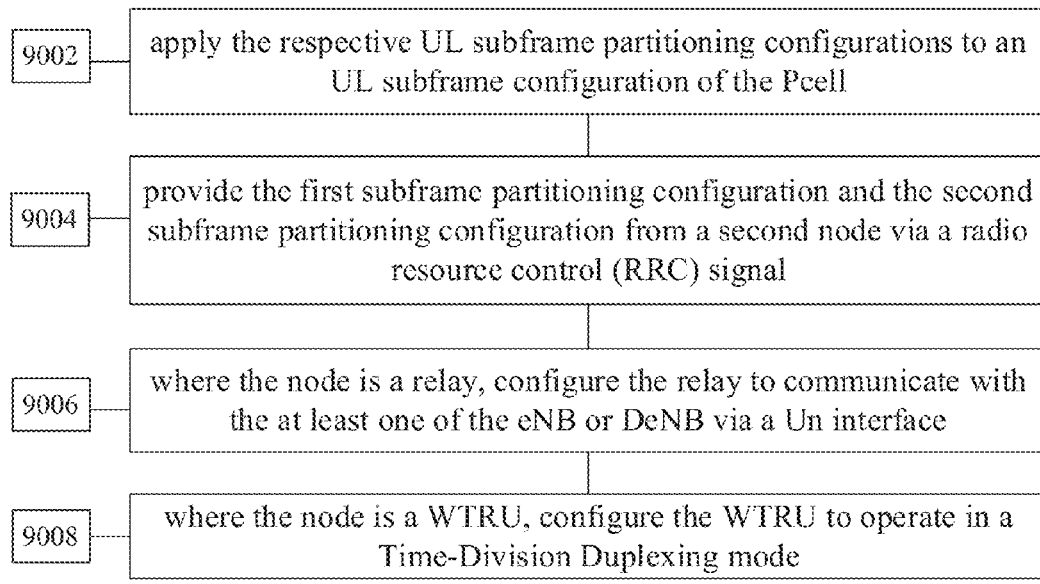
FIG. 9 illustrates a block diagram of one or more techniques regarding subframe restricted nodes consistent with embodiments.

Referring to FIG. 9, alternatively or additionally, embodiments contemplate that, at least a part of the first subframe partitioning configuration and the at least a part of the second subframe partitioning configuration respectively include uplink (UL) subframe partitioning configurations, and, at 9002 the node may be further configured to apply the respective UL subframe partitioning configurations to an UL subframe configuration of the Pcell. Alternatively or additionally, embodiments contemplate that, at 9004, the first subframe partitioning configuration and the second subframe partitioning configuration may be provided from a second node via a radio resource control (RRC) signal, the second node being in communication with the wireless communication system, and the second node being at least one of an evolved-Node B (eNB) or a donor evolved-Node B (DeNB). One or more embodiments contemplate that the node may be a relay node. Alternatively or additionally, embodiments contemplate that, at 9006 the node may be further configured to communicate with the at least one of the eNB or DeNB via a Un interface. Alternatively or additionally, embodiments contemplate that the node may be a wireless transmit/receive unit (WTRU). One or more embodiments contemplate that, at 9008, the WTRU may be further configured to operate in a Time-Division Duplexing mode.

Figure 10:
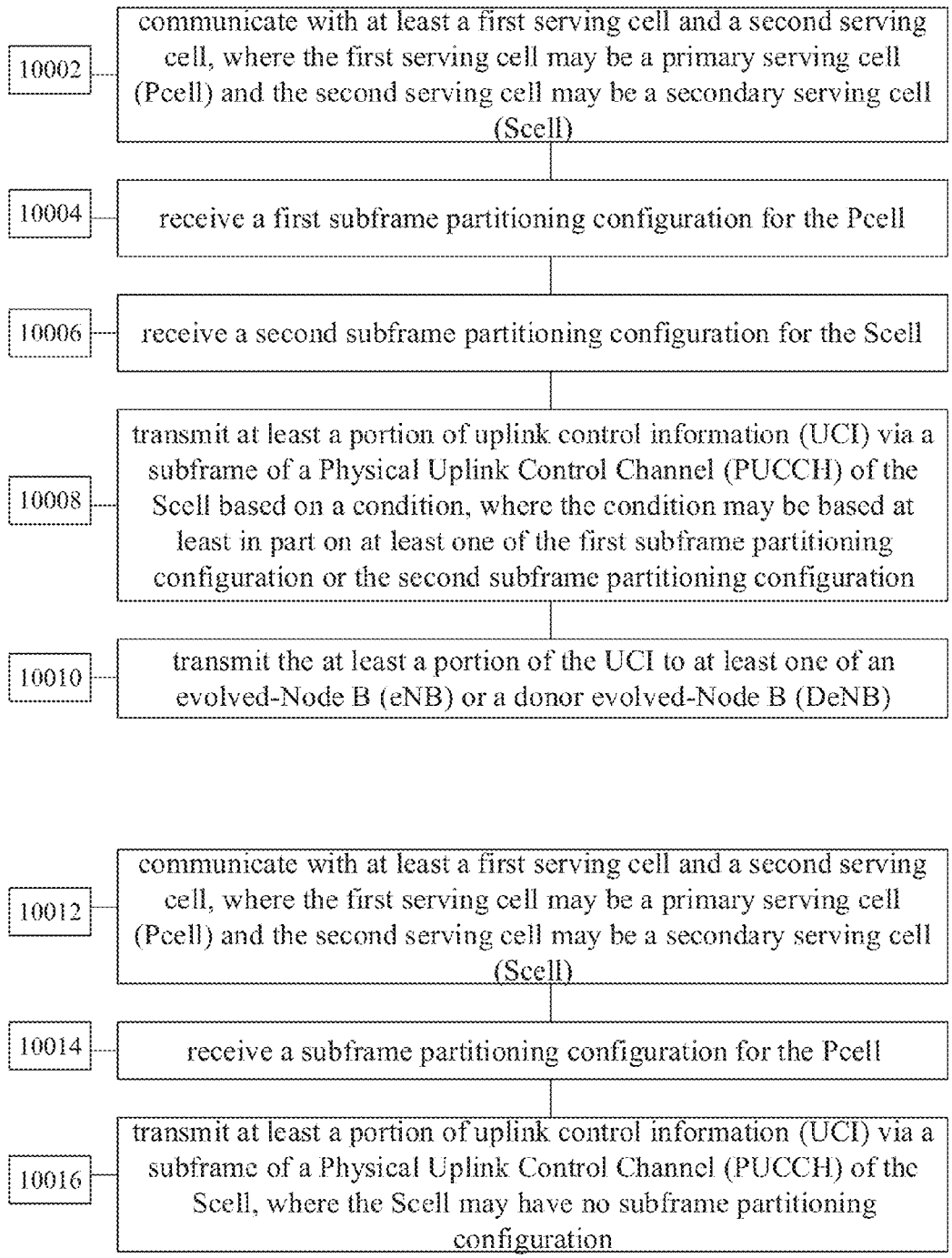
FIG. 10 illustrates a block diagram of one or more techniques regarding subframe restricted nodes consistent with embodiments.

Referring to FIG. 10, alternatively or additionally, embodiments contemplate a node that may be in communication with a wireless communication system. At 10002, the node may be configured, at least in part, to communicate with at least a first serving cell and a second serving cell, where the first serving cell may be a primary serving cell (Pcell) and the second serving cell may be a secondary serving cell (Scell). At 10004, embodiments contemplate that the node may be configured to receive a first subframe partitioning configuration for the Pcell. At 10006, embodiments contemplate that the node may be configured to receive a second subframe partitioning configuration for the Scell. At 10008, embodiments contemplate that the node may be configured to transmit at least a portion of uplink control information (UCI) via a subframe of a Physical Uplink Control Channel (PUCCH) of the Scell based on a condition, where the condition may be based at least in part on at least one of the first subframe partitioning configuration or the second subframe partitioning configuration. One or more embodiments contemplate that the condition may include the first subframe partitioning configuration for the Pcell having a restricted uplink in a subframe corresponding to the subframe of the Physical Uplink Control Channel (PUCCH) of the Scell.

Alternatively or additionally, embodiments contemplate that, at 10010, the node may be further configured to transmit the at least a portion of the UCI to at least one of an evolved-Node B (eNB) or a donor evolved-Node B (DeNB).

Alternatively or additionally, embodiments contemplate a node, where the node may be in communication with a wireless communication system. At 10012, embodiments contemplate that the node may be configured, at least in part, to communicate with at least a first serving cell and a second serving cell, where the first serving cell may be a primary serving cell (Pcell) and the second serving cell may be a secondary serving cell (Scell). At 10014, embodiments contemplate that that node may be configured to receive a subframe partitioning configuration for the Pcell. At 10016, embodiments contemplate that the node may be configured to transmit at least a portion of uplink control information (UCI) via a subframe of a Physical Uplink Control Channel (PUCCH) of the Scell, where the Scell may have no subframe partitioning configuration.

Figure 11:
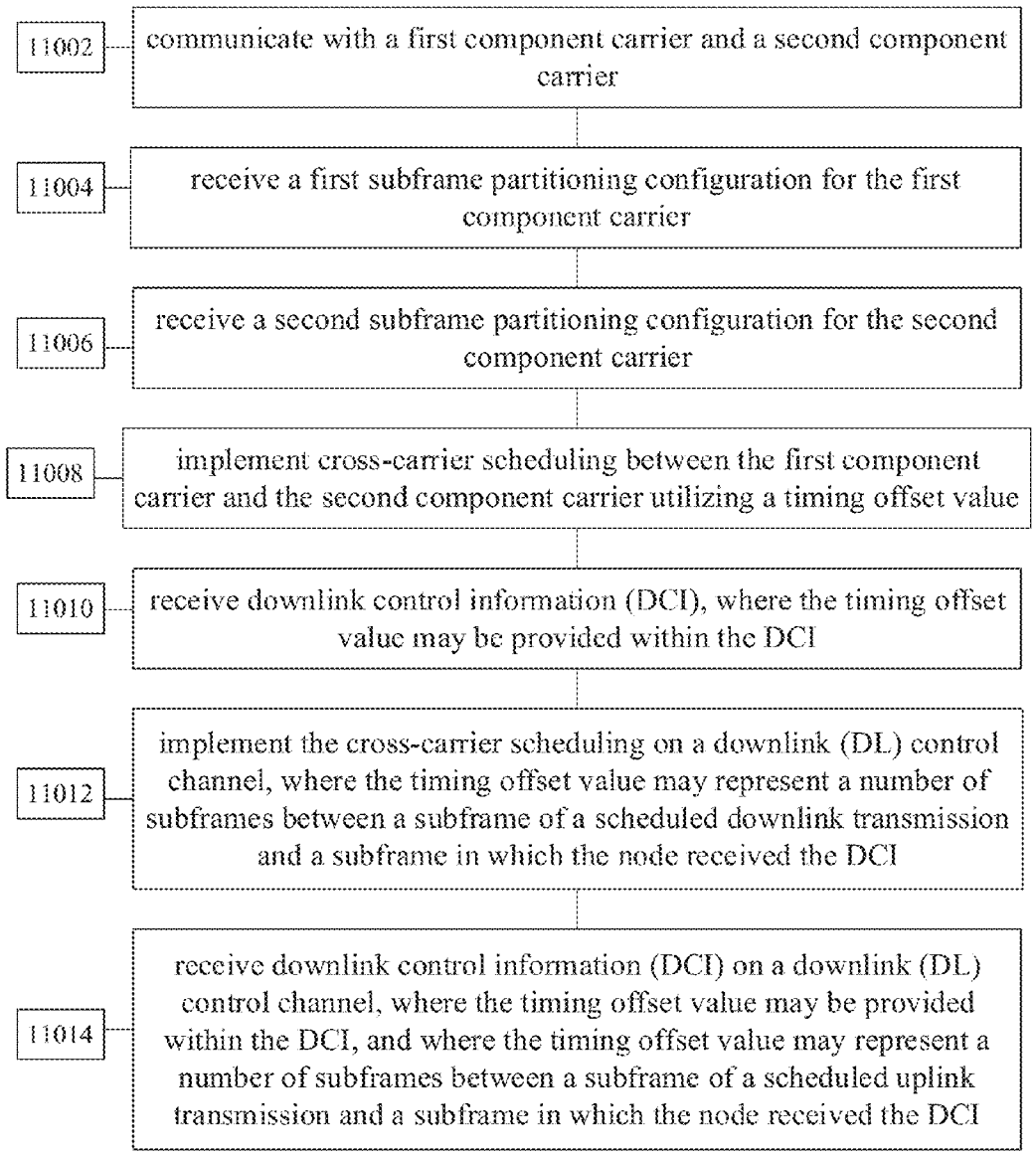
FIG. 11 illustrates a block diagram of one or more techniques regarding subframe restricted nodes consistent with embodiments.

Referring to FIG. 11, alternatively or additionally, embodiments contemplate a node, where the node may be in communication with a wireless communication system. At 11002, embodiments contemplate that the node may be configured, at least in part, to communicate with a first component carrier and a second component carrier. At 11004, embodiments contemplate that the node may be configured to receive a first subframe partitioning configuration for the first component carrier. At 11006, embodiments contemplate that the node may be configured to receive a second subframe partitioning configuration for the second component carrier. One or more embodiments contemplate that the first subframe partitioning configuration may be different than the second subframe partitioning configuration. At 11008, embodiments also contemplate that the node may be configured to implement cross-carrier scheduling between the first component carrier and the second component carrier utilizing a timing offset value.

Alternatively or additionally, embodiments contemplate that the node may be further configured, at 11010, to receive downlink control information (DCI), where the timing offset value mat be provided within the DCI. At 11012, embodiments contemplate that the node may be configured to implement the cross-carrier scheduling on a downlink (DL) control channel, where the timing offset value may represent a number of subframes between a subframe of a scheduled downlink transmission and a subframe in which the node received the DCI.

Alternatively or additionally, embodiments contemplate that the node may be configured, at 11014, to receive downlink control information (DCI) on a downlink (DL) control channel, where the timing offset value may be provided within the DCI. One or more embodiments contemplate that the timing offset value may represent a number of subframes between a subframe of a scheduled uplink transmission and a subframe in which the node received the DCI. One or more embodiments contemplate that the DL control channel may be at least one of a Relay-Physical Downlink Control Channel (R-PDCCH) or a Physical Downlink Control Channel (PD-CCH).

Contemplated embodiments may be based on the 3GPP LTE technology and related specifications, and may be equally applicable to any wireless technology implementing aggregation of carriers with different time-interval (e.g., sub-frame) configurations such as but not limited to other 3GPP technology based on WCDMA, HSPA, HSUPA and HSDPA. For example, WTRUs connected to a relay may also be considered as a SRNode for which the relay may be considered as an eNB. Embodiments may be used individually or in any combination thereof.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
memory; and
a processor configured to:
communicate with at least a first serving cell and a second serving cell over an interface;
receive a first subframe partitioning configuration for the first serving cell, wherein the first subframe partitioning configuration comprises one or more subframes reserved for uplink transmission and one or more sub-frames reserved for downlink transmission;
receive a second subframe partitioning configuration for the second serving cell, wherein the second subframe partitioning configuration comprises one or more sub-frames reserved for uplink transmission and one or more subframes reserved for downlink transmission; and
apply at least a part of the first subframe partitioning configuration and at least a part of the second subframe partitioning configuration to at least one of the first serving cell or the second serving cell;
wherein a direction of a subframe of the second subframe partitioning configuration is different from a direction of a corresponding subframe of the first subframe partitioning configuration.

2. The WTRU of claim 1, wherein the first serving cell is a primary serving cell (Pcell) and the second serving cell is a secondary serving cell (Scell).

3. The WTRU of claim 1, wherein the interface is a Uu interface or a Un interface.

4. The WTRU of claim 1, wherein the processor is further configured to apply a union of the at least part of the first subframe partitioning configuration and the at least part of the second subframe partitioning configuration to the at least one of the first serving cell or the second serving cell.

5. The WTRU of claim 1, wherein the processor is further configured to apply an intersection of the at least part of the first subframe partitioning configuration and the at least part of the second subframe partitioning configuration to the at least one of the first serving cell or the second serving cell.

6. The WTRU of claim 1, wherein the processor is further configured to limit the application of the at least part of the first subframe partitioning configuration and the at least part of the second subframe partitioning configuration to an uplink (UL) subframe configuration of the at least one of the first serving cell or the second serving cell.

7. The WTRU of claim 1, wherein the processor is further configured to limit the application of the at least part of the first subframe partitioning configuration and the at least part of the second subframe partitioning configuration to a downlink (DL) subframe configuration of the at least one of the first serving cell or the second serving cell.

8. The WTRU of claim 2, wherein the at least a part of the first subframe partitioning configuration and the at least a part of the second subframe partitioning configuration respectively include uplink (UL) subframe partitioning configurations, and the WTRU is further configured to apply the respective UL subframe partitioning configurations to an UL subframe configuration of the Pcell.

9. The WTRU of claim 1, wherein the first subframe partitioning configuration and the second subframe partitioning configuration is provided from a second node via a radio resource control (RRC) signal, the second node being in communication with the wireless communication system, and the second node being at least one of an evolved-Node B (eNB) or a donor evolved-Node B (DeNB).

10. The WTRU of claim 1, wherein the WTRU is further configured to operate in a Time-Division Duplexing mode.

11. The WTRU of claim 1, wherein the processor is configured to not use the subframe of the second subframe partitioning configuration.

12. The WTRU of claim 1, wherein the first serving cell is a primary serving cell (Pcell) and the second serving cell is a secondary serving cell (Scell), and wherein the WTRU is configured to not use subframes of the second subframe partitioning configuration when directions of the subframes of the second subframe partitioning configuration are different from directions of corresponding subframes of the first subframe partitioning configuration.

13. The WTRU of claim 1, wherein the WTRU is configured to operate in a half-duplex mode.

14. A wireless transmit/receive unit (WTRU) comprising:
memory; and
a processor configured to:
communicate with at least a first component carrier and a second component carrier;
receive a first subframe partitioning configuration for the first component carrier, wherein the first subframe partitioning configuration comprises one or more subframes reserved for uplink transmission and one or more subframes reserved for downlink transmission;
receive a second subframe partitioning configuration for the second component carrier, wherein the second subframe partitioning configuration comprises one or more subframes reserved for uplink transmission and one or more subframes reserved for downlink transmission; and
transmit at least a portion of uplink control information (UCI) via a subframe of a Physical Uplink Control Channel (PUCCH) of the second component carrier based on a condition that a subframe of the first component carrier corresponding to the subframe of the PUCCH of the second component carrier is unavailable for uplink (UL) transmission.

15. The WTRU of claim 14, wherein the condition includes the first subframe partitioning configuration for the first component carrier having a restricted uplink in a subframe corresponding to the subframe of the Physical Uplink Control Channel (PUCCH) of the second component carrier.

16. The WTRU of claim 14, wherein processor is further configured to transmit the at least a portion of the UCI to at least one of an evolved-Node B (eNB) or a donor evolved-Node B (DeNB).

17. The WTRU of claim 14, wherein a direction of a subframe of the first subframe partitioning configuration is different from a corresponding subframe of the second subframe partitioning configuration, and wherein the processor is configured to not use the subframe of the second subframe partitioning configuration.

18. The WTRU of claim 14, wherein the processor is configured to not use subframes of the second subframe partitioning configuration when directions of the subframes of the second subframe partitioning configuration are different from directions of corresponding subframes of the first subframe partitioning configuration.

19. The WTRU of claim 14, wherein the WTRU is configured to operate in a half-duplex mode.

20. A wireless transmit/receive unit (WTRU) comprising:
memory; and
a processor configured to:
communicate with a first component carrier and a second component carrier;
receive a first subframe partitioning configuration for the first component carrier, wherein the first subframe partitioning configuration comprises one or more subframes reserved for uplink transmission and one or more subframes reserved for downlink transmission;
receive a second subframe partitioning configuration for the second component carrier, wherein the second subframe partitioning configuration comprises one or more subframes reserved for uplink transmission and one or more subframes reserved for downlink transmission, the first subframe partitioning configuration being different than the second subframe partitioning configuration; and
implement cross-carrier scheduling between the first component carrier and the second component carrier utilizing a timing offset value.

21. The WTRU of claim 20, wherein the processor is further configured to:
receive downlink control information (DCI), the timing offset value being provided within the DCI; and
implement the cross-carrier scheduling on a downlink (DL) control channel, the timing offset value representing a number of subframes between a subframe of a scheduled downlink transmission and a subframe in which the WTRU received the DCI.

22. The WTRU of claim 20, wherein the processor is further configured to:
receive downlink control information (DCI) on a downlink (DL) control channel, the timing offset value being provided within the DCI, the timing offset value representing a number of subframes between a subframe of a scheduled uplink transmission and a subframe in which the WTRU received the DCI, the DL control channel being at least one of a Relay-Physical Downlink Control Channel (R-PDCCH) or a Physical Downlink Control Channel (PDCCH).

* * * * *